US012118910B2

(12) United States Patent
Zhang

(10) Patent No.: US 12,118,910 B2
(45) **Date of Patent: *Oct. 15, 2024**

(54) DISPLAY PANEL AND DISPLAY DEVICE

(71) Applicant: Xiamen Tianma Micro-Electronics Co.,Ltd., Xiamen (CN)

(72) Inventor: Yuheng Zhang, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,000

(22) Filed: Jul. 21, 2023

(65) Prior Publication Data

US 2023/0360576 A1 Nov. 9, 2023

Related U.S. Application Data

(63) Continuation of application No. 17/903,833, filed on Sep. 6, 2022, now Pat. No. 11,741,877, which is a continuation of application No. 17/452,283, filed on Oct. 26, 2021, now Pat. No. 11,468,814.

(30) Foreign Application Priority Data

Aug. 6, 2021 (CN) ......................... 202110905723.6

(51) Int. Cl.
*G09G 3/20* (2006.01)

(52) U.S. Cl.
CPC ....... *G09G 3/20* (2013.01); *G09G 2310/0272* (2013.01); *G09G 2310/061* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

2019/0340977 A1* 11/2019 Park ..................... G09G 3/3275

* cited by examiner

*Primary Examiner* — Christopher J Kohlman
(74) *Attorney, Agent, or Firm* — Anova Law Group, PLLC

(57) ABSTRACT

A display panel includes a pixel circuit and a light-emitting element. The pixel circuit includes a driving module, a data writing module, and a bias adjustment module. The driving module includes a driving transistor. The data writing module is configured to provide a data signal for the driving transistor. The bias adjustment module is configured to provide a bias adjustment signal for the driving transistor. A time period of one frame of the display panel includes a non-light-emitting stage and a light-emitting stage. The non-light-emitting stage includes a bias adjustment stage. At least one of a source or a drain of the driving transistor is configured to receive the bias adjustment signal in the bias adjustment stage. An operating state of the pixel circuit includes a first mode and a second mode.

20 Claims, 26 Drawing Sheets

DISPLAY PANEL AND DISPLAY DEVICE

CROSS-REFERENCE TO RELATED APPLICATIONS

This application is a continuation of U.S. patent application Ser. No. 17/903,833, filed on Sep. 6, 2022, which is a continuation of U.S. patent application Ser. No. 17/452,283, filed on Oct. 26, 2021, now U.S. Pat. No. 11,468,814, issued on Oct. 11, 2022, which claims the priority of Chinese patent application No. 202110905723.6, filed on Aug. 6, 2021, the entirety of all of which are incorporated herein by reference.

FIELD

The present disclosure generally relates to the field of display technology and, more particularly, relates to a display panel and a display device.

BACKGROUND

A pixel circuit provides a driving current required for the display for the light-emitting element of the display device, controls whether the light-emitting element enters the light-emitting stage, and, thus, becomes an indispensable element in most display devices. However, as the use time increases, the internal characteristics of the driving transistor in the pixel circuit change slowly, which causes a shift of the threshold voltage of the driving transistor and affects the generated driving current. Thus, the display effect of the display device is unsatisfactory, and a screen flickering phenomenon easily occurs.

SUMMARY

One aspect of the present disclosure provides a display panel. The display panel includes a pixel circuit and a light-emitting element. The pixel circuit includes a driving module, a data writing module, and a bias adjustment module. The driving module includes a driving transistor. The data writing module is configured to provide a data signal for the driving transistor. The bias adjustment module is configured to provide a bias adjustment signal for the driving transistor. A time period of one frame of the display panel includes a non-light-emitting stage and a light-emitting stage. The non-light-emitting stage includes a bias adjustment stage. At least one of a source or a drain of the driving transistor is configured to receive the bias adjustment signal in the bias adjustment stage. An operating state of the pixel circuit includes a first mode and a second mode. A time length of the non-light-emitting stage in the first mode is L1, and a time length of the non-light-emitting stage in the second mode is L2. L1>L2. A working process of the display panel in the first mode includes a first frame, and a working process of the display panel in the second mode includes a second frame. A time length of the bias adjustment stage in the first frame is W1, and a time length of the bias adjustment stage in the second frame is W2. $W2/W1 \geq 1$, and/or $W2/W1 < L1/L2$.

Another aspect of the present disclosure provides a display panel. The display panel includes a pixel circuit and a light-emitting element. The pixel circuit includes a driving module, a data writing module, and a bias adjustment module. The driving module includes a driving transistor. The data writing module is configured to provide a data signal for the driving transistor. The bias adjustment module is configured to provide a bias adjustment signal for the driving transistor. The compensation module is connected between a gate and a drain of the driving transistor. A time period of one frame of the display panel includes a non-light-emitting stage and a light-emitting stage. The non-light-emitting stage includes a bias adjustment stage. The compensation module being turned off and at least one of a source or the drain of the driving transistor is configured to receive the bias adjustment signal in the bias adjustment stage. An operating state of the pixel circuit includes a first mode and a second mode. A time length of the non-light-emitting stage in the first mode is L1, and a time length of the non-light-emitting stage in the second mode is L2. L1>L2. A working process of the display panel in the first mode includes a first frame, and a working process of the display panel in the second mode includes a second frame. A time length of the bias adjustment stage in the first frame is W1, and a time length of the bias adjustment stage in the second frame is W2. $W2/W1 \geq 1$, and/or $W2/W1 < L1/L2$.

Another aspect of the present disclosure provides a display panel. The display panel includes a pixel circuit and a light-emitting element. The pixel circuit includes a driving module. The driving module includes a driving transistor. A time period of one frame of the display panel includes a non-light-emitting stage and a light-emitting stage. The non-light-emitting stage includes a bias adjustment stage. At least one of a source or a drain of the driving transistor is configured to receive a bias adjustment signal in the bias adjustment stage. An operating state of the pixel circuit includes a first mode and a second mode. A time length of the non-light-emitting stage in the first mode is L1, and a time length of the non-light-emitting stage in the second mode is L2. L1>L2. A working process of the display panel in the first mode includes a first frame, and a working process of the display panel in the second mode includes a second frame. A time length of the bias adjustment stage in the first frame is W1, and a time length of the bias adjustment stage in the second frame is W2. $W2/W1 \geq 1$, and/or $W2/W1 < L1/L2$.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
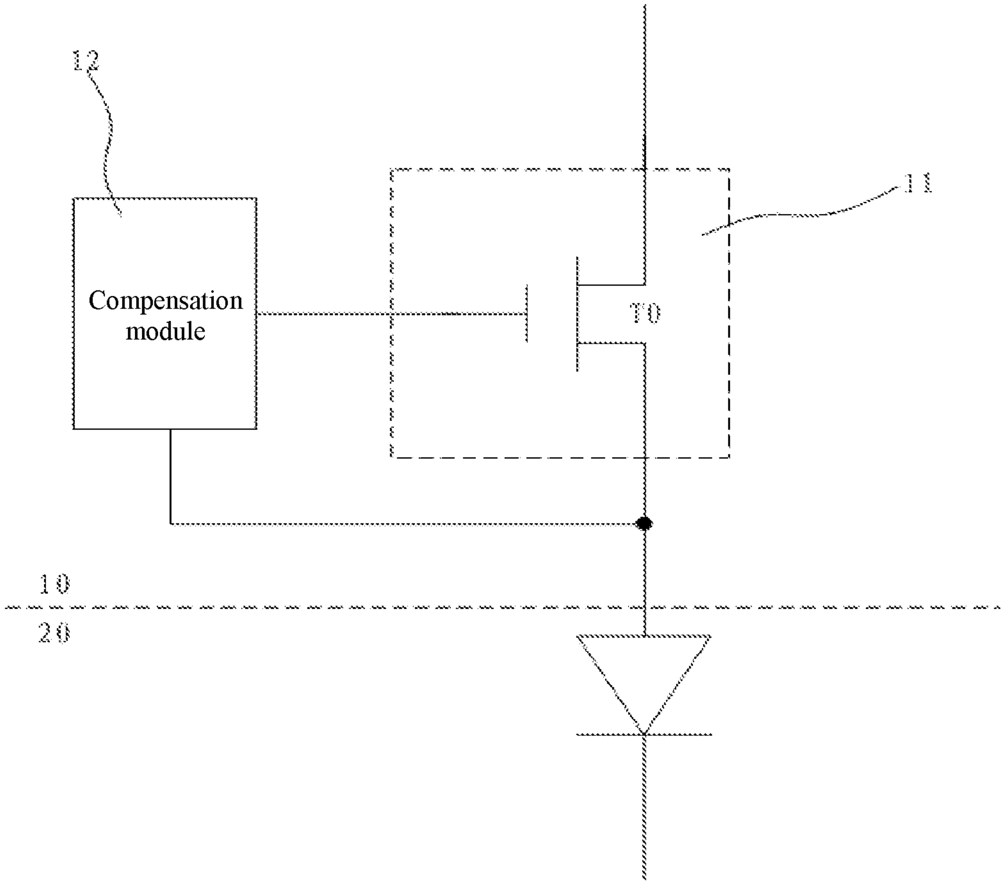
FIG. 1 illustrates a schematic diagram of an exemplary pixel circuit consistent with disclosed embodiments of the present disclosure.
Figure 2:
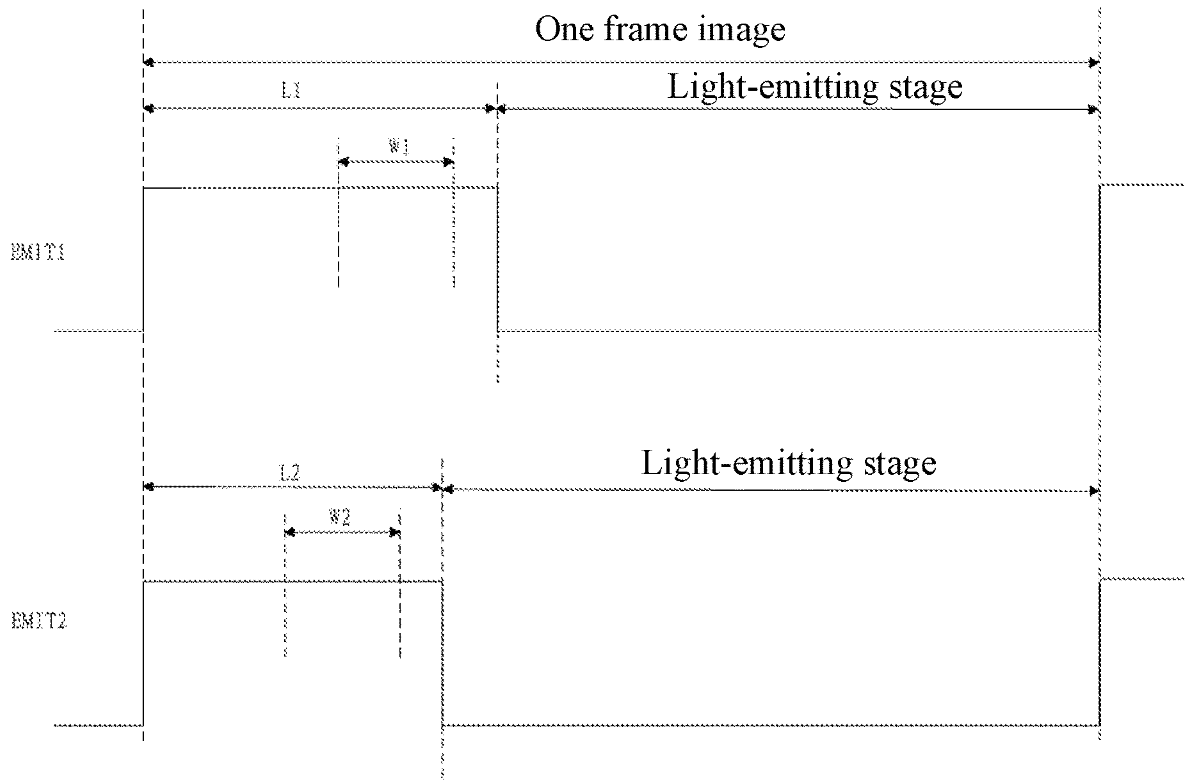
FIG. 2 illustrates an exemplary timing sequence diagram of a first mode and a second mode consistent with disclosed embodiments of the present disclosure.

The present disclosure provides a display panel. FIG. 1 illustrates a schematic diagram of a pixel circuit consistent with disclosed embodiments of the present disclosure; and FIG. 2 illustrates a timing sequence diagram of a first mode and a second mode consistent with disclosed embodiments of the present disclosure. Referring to FIG. 1 and FIG. 2, the display panel may include a pixel circuit 10 and a light-emitting element 20. The pixel circuit 10 may include a driving module 11 and a compensation module 12. The driving module 11 may be configured to provide a driving current for the light-emitting element 20. The driving module 11 may include a driving transistor T0. The compensation module 12 may be configured to compensate a threshold voltage of the driving transistor T0, and may be connected between a gate and a drain of the driving transistor T0. A time period of one frame of the display panel may include a non-light-emitting stage and a light-emitting stage. The non-light-emitting stage may include a bias adjustment stage. In the bias adjustment stage, the compensation module 12 may be turned off, and one of the source and the drain of the driving transistor T0 may receive a bias adjustment signal for adjusting the bias state of the driving transistor T0.

The operating state of the pixel circuit 10 may include a first mode EMIT1 and a second mode EMIT2. A time length of the non-light-emitting stage in the first mode EMIT1 may be L1, and a time length of the non-light-emitting stage in the second mode EMIT2 may be L2, where L1>L2. The working process of the display panel in the first mode EMIT1 may include a first frame, and the working process of the display panel in the second mode EMIT2 may include a second frame. In the first frame, the time length of the bias adjustment stage may be W1, and in the second frame, the time length of the bias adjustment stage may be W2, where W1/L1<W2/L2.

It should be understood that a brightness of the light-emitting element in the first mode EMIT1 may be lower than a brightness of the light-emitting element in the second mode EMIT2. The disclosed display panel may adjust the brightness of the light-emitting element. The time length L1 of the non-light-emitting stage in the first mode EMIT1 may be greater than the time length L2 of the non-light-emitting stage in the second mode EMIT2. In a case where the total time length of the non-light-emitting stage and the light-emitting stage of each frame is same or similar, the time length of the light-emitting stage in the first mode EMIT1 may be greater than the time length of the light-emitting stage in the second mode EMIT2. Accordingly, the brightness of the light-emitting element in the first mode EMIT1 may be lower, and the brightness of the light-emitting element in the second mode EMIT2 may be higher. The brightness mode may be switched by switching the first mode EMIT1 and the second mode EMIT2.

It should be noted that the brightness of the light-emitting element in the first mode and the brightness of the light-emitting element in the second mode may refer to the total brightness of the final display image reflected in human eye. Because the time length of the light-emitting stage in the first mode is less than the time length of the light-emitting stage in the second mode, the time length of the light-emitting stage of each frame in the second mode may become larger, which may cause a higher total brightness in the second mode for the entire image that is ultimately observed by the human eye.

The pixel circuit 10 may include the driving module 11, and an output terminal of the driving module 11 may be coupled to the light-emitting element 20. The driving module 11 may include the driving transistor T0. After the driving transistor T0 is turned on, the driving module 11 may provide a driving current for the light-emitting element 20. Optionally, a source of the driving transistor T0 may be an input terminal of the driving module 11, and a drain of the driving transistor T0 may be an output terminal of the driving module 11. The structure of the driving module may not be limited by the present disclosure, and may be determined according to the conduction type of the driving transistor T0. The pixel circuit 10 may further include the compensation module 12 for compensating the threshold voltage of the driving transistor T0. The compensation module 12 may be connected between the gate and the drain of the driving transistor T0. When the transmission path of the compensation module 12 is controlled to be turned on, the transmission path between the gate and the drain of the driving transistor T0 may be turned on, such that the voltage between the gate of the driving transistor T0 and the output terminal of the driving module 11 may be adjusted, and the threshold voltage of the driving transistor T0 may be compensated.

Figure 3:
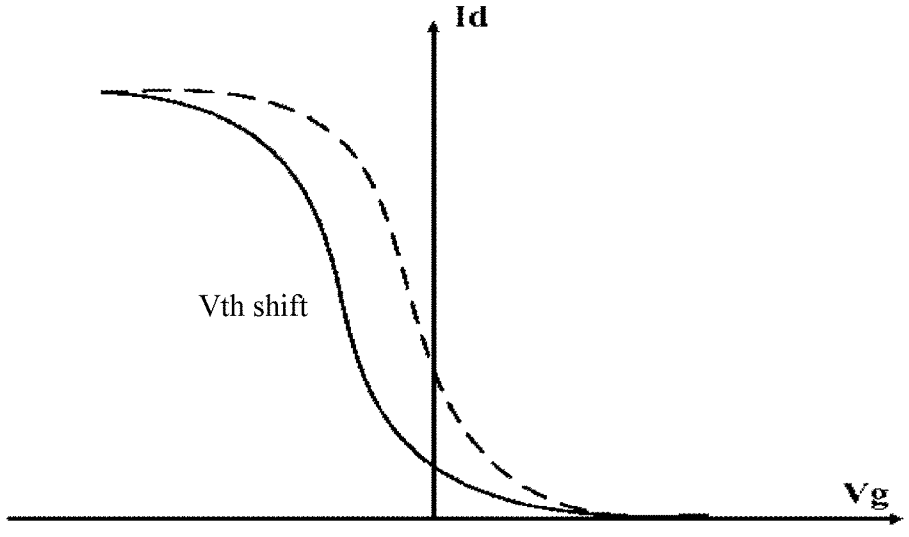
FIG. 3 illustrates a schematic diagram of a shift of Id-Vg curve of a driving transistor in an exemplary pixel circuit consistent with disclosed embodiments of the present disclosure.

In the non-bias adjustment stage such as the light-emitting stage, etc., of the pixel circuit, when the driving transistor is a PMOS transistor, there may be a situation where the gate potential of the driving transistor is greater than the drain potential of the driving transistor when the driving transistor is turned on. When the driving transistor is an NMOS transistor, there may be a situation where the gate potential of the driving transistor is lower than the drain potential of the driving transistor when the driving transistor is turned on. If the driving transistor is kept in such state for a long term, the ions inside the driving transistor may be polarized to form a built-in electric field inside the driving transistor, which may cause the threshold voltage of the driving transistor to continuously increase. FIG. 3 illustrates a schematic diagram of a shift of Id-Vg curve of the driving transistor. Referring to FIG. 3, the Id-Vg curve may shift, which may cause the threshold voltage Vth of the driving transistor to shift, thereby affecting the driving current flowing into the light-emitting element, and further affecting the display effect of the display panel.

The working process of the pixel circuit 10 may include a bias adjustment stage. In the bias adjustment stage, the compensation module 12 may be turned off, and one of the source and drain of the driving transistor T0 may receive the bias adjustment signal to adjust the bias state of the driving transistor T0. Furthermore, the potential difference between the gate potential and the drain potential of the driving transistor T0, or the potential difference between the gate potential and the source potential of the driving transistor T0 may be improved, the polarization degree of ions inside the driving transistor T0 may be reduced, such that the Id-Vg curve of the driving transistor T0 may not be shifted, which may reduce the shift of the threshold voltage of the driving transistor T0, and may improve the display effect of the display panel.

Further, in the present disclosure, the time length of the bias adjustment stage and the time length of the non-light-emitting stage may not change in a same proportion. When the display panel changes from the first mode EMIT1 to the second mode EMIT2 based on the changing requirements of the brightness, the time length of the non-light-emitting stage may be shortened. In view of this, the time length of the bias adjustment stage may be adjusted according to W1/L1<W2/L2, such that the time length change of the bias adjustment stage caused by the mode change of the operating state may be substantially small. In view of this, the time length of the bias adjustment stage in the second mode EMIT2 may be substantially large.

Because the time length of the light-emitting stage in the second mode EMIT2 is substantially large, the bias situation may be substantially serious, and a substantially large time length of the bias adjustment state may be required to cancel out the influence caused by the bias of the driving transistor. The time length of the bias adjustment stage in the second mode EMIT2 may be kept substantially large, thereby avoiding the flickering phenomenon caused by a substantially small time length of the bias adjustment stage in the second mode EMIT2 when adjusting the mode of the display panel. Therefore, in the disclosed embodiments, the flickering problem of the display panel in different brightness modes may be solved, which may ensure the display effect of the display device.

Figure 4:
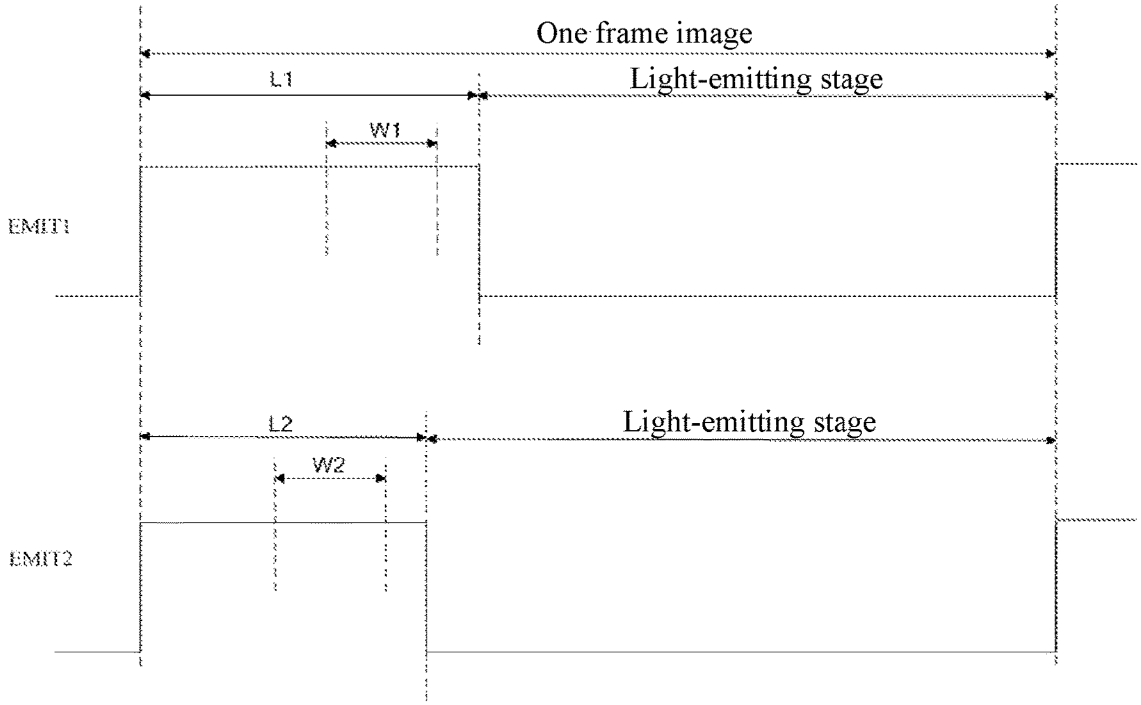
FIG. 4 illustrates another exemplary timing sequence diagram of a first mode and a second mode consistent with disclosed embodiments of the present disclosure.

In one embodiment, the relationship between a time length W1 of the bias adjustment stage in the first frame and a time length W2 of the bias adjustment stage in the second frame may satisfy W1≤W2. FIG. 4 illustrates another timing sequence diagram of the first mode and the second mode. Referring to FIG. 4, the time length W1 of the bias adjustment stage in the first frame may be equal to the time length W2 of the bias adjustment stage in the second frame. In other words, the time length of the bias adjustment stage in different brightness modes may remain unchanged, which may solve the flickering problem of the display panel in different brightness modes.

Figure 5:
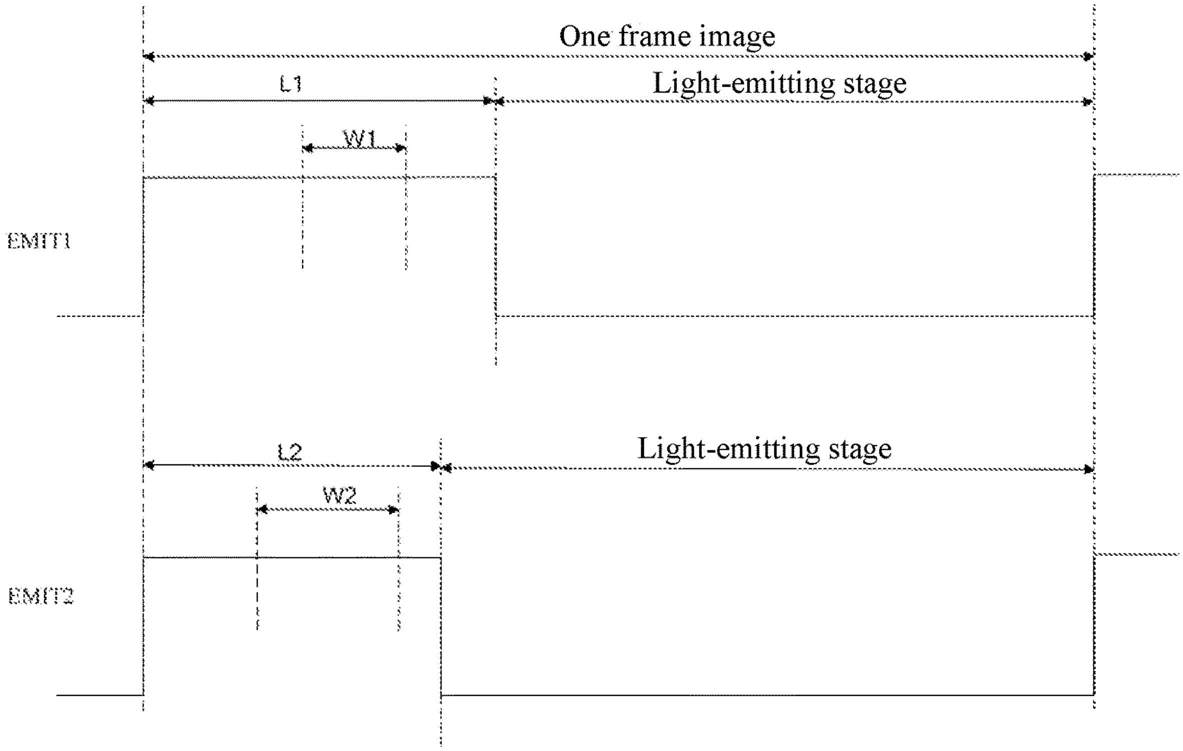
FIG. 5 illustrates another exemplary timing sequence diagram of a first mode and a second mode consistent with disclosed embodiments of the present disclosure.

FIG. 5 illustrates another timing sequence diagram of the first mode and the second mode. Referring to FIG. 5, the time length W1 of the bias adjustment stage in the first frame may be less than the time length W2 of the bias adjustment stage in the second frame. In one embodiment, the time length L1 of the non-light-emitting stage in the first mode EMIT1 may be greater than the time length L2 of the non-light-emitting stage in the second mode EMIT2. Further, when the time length of each frame is the same, the time length of the light-emitting stage in the first mode EMIT1 may be less than the time length of the light-emitting stage in the second mode EMIT2. Because the threshold voltage shift of the driving transistor T0 is mainly caused in the light-emitting stage, the greater the time length of the light-emitting stage, the more serious the threshold voltage shift. Therefore, through configuring the time length W2 of the bias adjustment stage in the second frame to be greater than the time length W1 of the bias adjustment stage in the first frame, the threshold voltages of the driving transistor T0 in the first mode EMIT1 and the second mode EMIT2 may be balanced, to solve the flickering problem of the display panel in different brightness modes.

In certain embodiments, under the premise of $W1/L1<W2/L2$, the relationship between W1 and W2 may satisfy $W1>W2$. In view of this, when the display panel changes from the first mode to the second mode, the time length of the non-light-emitting stage may become smaller, and the time length of the bias adjustment stage may also become smaller. For example, when there is a certain requirement for the time length of the non-light-emitting stage of the second mode, the time length of the bias adjustment stage may be appropriately shortened, to ensure that the time length of the non-light-emitting stage may be substantially short.

In one embodiment, the relationship of the variation amplitudes of the time length W1 of the bias adjustment stage in the first frame, the time length W2 of the bias adjustment stage in the second frame, the time length L1 of the non-light-emitting stage of the pixel circuit in the first mode EMIT1, and the time length L2 of the non-light-emitting stage of the pixel circuit in the second mode EMIT2 may satisfy $W2/W1<L1/L2$, where $W2/W1\geq 1$ and $L1/L2>1$. In the present disclosure, the extension of the time length of the non-light-emitting stage in the first mode may be greater than the shortening of the time length of the bias adjustment stage in the first mode, which may avoid the occurrence of the incomplete bias adjustment in the first mode caused by too small time length of the bias adjustment stage.

In one embodiment, the time length W1 of the bias adjustment stage in the first frame, the time length W2 of the bias adjustment stage in the second frame, the time length L1 of the non-light-emitting stage of the pixel circuit in the first mode EMIT1, and the time length L2 of the non-light-emitting stage of the pixel circuit in the second mode EMIT2 may satisfy $W1/L1<1/2$, and/or $W2/L2<1/2$. In the disclosed embodiments, the time length W1 of the bias adjustment stage in the first frame and the time length W2 of the bias adjustment stage in the second frame may be optimized by limiting the range of a ratio of W1 over L1 and limiting the range of a ratio of W2 over L2, such that the time length of bias adjustment stage may be prevented from being too large.

In the process of displaying one frame image, there may be a high-brightness light-emitting element and a low-brightness light-emitting element. The gate potential of the driving transistor corresponding to the high-brightness light-emitting element may be substantially small, and the gate potential of the driving transistor corresponding to the low-brightness light-emitting element may be substantially large, while the bias adjustment signal in some cases may be the same. Therefore, if the time length of the bias adjustment stage is set to be too large, the difference between the bias adjustment of the driving transistor corresponding to the high-brightness light-emitting element and the bias adjustment of the driving transistor corresponding to the low-brightness light-emitting element may be further enlarged, which may make the display effect of the display panel substantially poor.

Therefore, in one embodiment, through configuring the correlation ratio of $W1/L1<1/2$ and/or $W2/L2<1/2$, it may be ensured that a ratio of the time length of the bias adjustment stage over the time length of the entire non-light-emitting stage may be less than ½. Thus, the situation where the difference between bias adjustments of the driving transistors corresponding to the light-emitting elements with different brightness caused by too large time length of the bias adjustment stage is substantially large may be prevented, thereby improving the display effect of the display panel.

In one embodiment, the bias adjustment stage in the first frame may include N1 sub-bias adjustment stages, where $N1\geq 1$. The bias adjustment stage in the second frame may include N2 sub-bias adjustment stages, where $N2\geq 1$. The time length of the at least one sub-bias adjustment stage in the first frame may be equal to the time length of the at least one sub-bias adjustment stage in the second frame.

Figure 6:
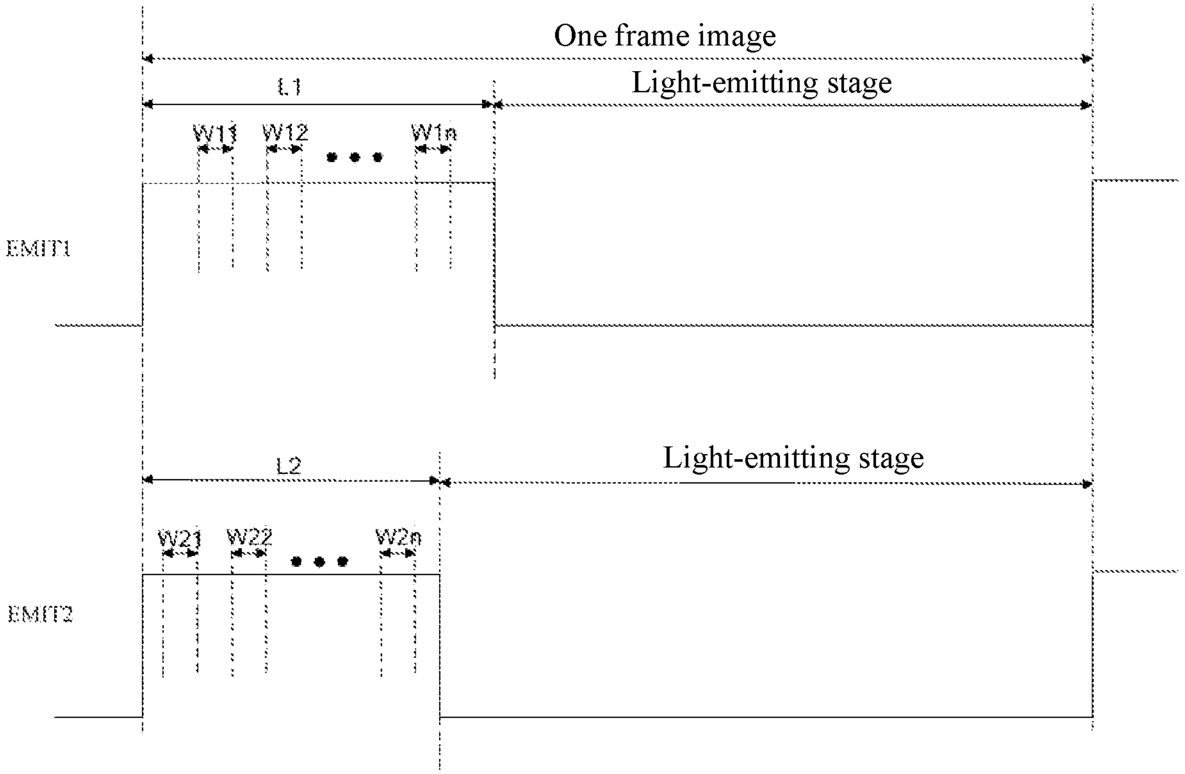
FIG. 6 illustrates another exemplary timing sequence diagram of a first mode and a second mode consistent with disclosed embodiments of the present disclosure.

FIG. 6 illustrates another timing sequence diagram of the first mode and the second mode. In one embodiment, referring to FIG. 6, the time lengths of the N1 sub-bias adjustment stages contained in the bias adjustment stage in the first frame may include a time length W11 of the first sub-bias adjustment stage to a time length W1n of the $N1^{th}$ sub-bias adjustment stage, respectively. The time lengths of the N2 sub-bias adjustment stages contained in the bias adjustment stage in the second frame may include a time length W21 of the first sub-bias adjustment stage to a time length W2n of the $N2^{th}$ sub-bias adjustment stage, respectively. Here, n in W1n and W2n may merely be a code used to refer to a certain quantity, and may not mean that the quantities of sub-bias adjustment stages in the first frame and the second frame is the same. In one embodiment, N1 and N2 may be equal, or unequal. The time length of at least one sub-bias adjustment stage in the first frame may be equal to the time length of at least one sub-bias adjustment stage in the second frame. Therefore, the bias adjustment stage may be composed of at least one sub-bias adjustment stage, and at least one sub-bias adjustment stage in the first frame and the second frame may have equal time length. In other words, the time length of at least one sub-bias adjustment stage may not change as the brightness mode is adjusted, thereby ensuring that the display panel may avoid flickering problems in different brightness modes.

Figure 7:
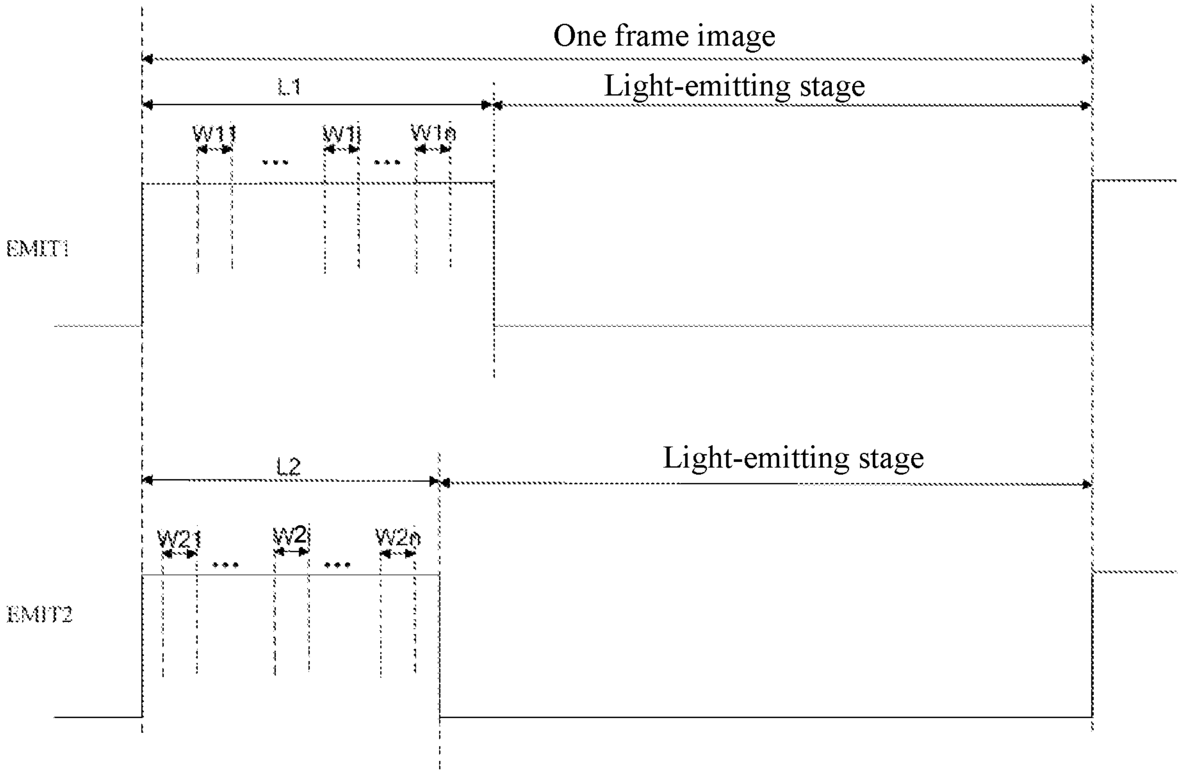
FIG. 7 illustrates another exemplary timing sequence diagram of a first mode and a second mode consistent with disclosed embodiments of the present disclosure.

FIG. 7 illustrates another timing sequence diagram of the first mode and the second mode. In one embodiment, referring to FIG. 7, the time length W1i of the $i^{th}$ sub-bias adjustment stage in the first frame may be equal to the time length W2i of the $i^{th}$ sub-bias adjustment stage in the second frame, where $1\leq i\leq N0$. When $N1\neq N2$, N0 may be the smaller one of N1 and N2. When $N1=N2$, $N0=N1=N2$. In one embodiment, the time lengths of the sub-bias adjustment stages in the same order from the beginning of the non-light-emitting stage in the first frame and the second frame may be the same, such that the total time lengths of the bias adjustment stages in the first frame and the second frame may be the same, to further ensure that the results of the bias adjustments in different brightness modes may be similar, and to ensure that the display panel may avoid flickering problems in different brightness modes.

In addition, in one embodiment, $|N1-N2|\geq 1$. When $W1<W2$, $N2-N1\geq 1$. In other words, in view of this, the bias adjustment stage in the second frame may include at least one more sub-bias adjustment stage than the bias adjustment stage in the first frame, and, thus, the time length of the bias adjustment stage may be adjusted by adjusting the quantity of the sub-bias adjustment stages. Because the control signal in the display panel is often a pulse with a certain width, adjusting the width of the pulse may often require adjusting various signals in the circuit components that generate the pulse, which may cause a substantially large adjustment. Adjusting the quantity of pulses may often require providing a specific instruction. Therefore, in one embodiment, through configuring $N2-N1\geq 1$, such that $W1<W2$. Similarly, when $W1>W2$, $N1-N2\geq 1$. In view of this, the bias adjustment stage in the first frame may include at least one more sub-bias adjustment stage than the bias adjustment stage in the second frame. Therefore, the time length of the bias adjustment stage may be adjusted by adjusting the quantity of the sub-bias adjustment stages.

Figure 8:
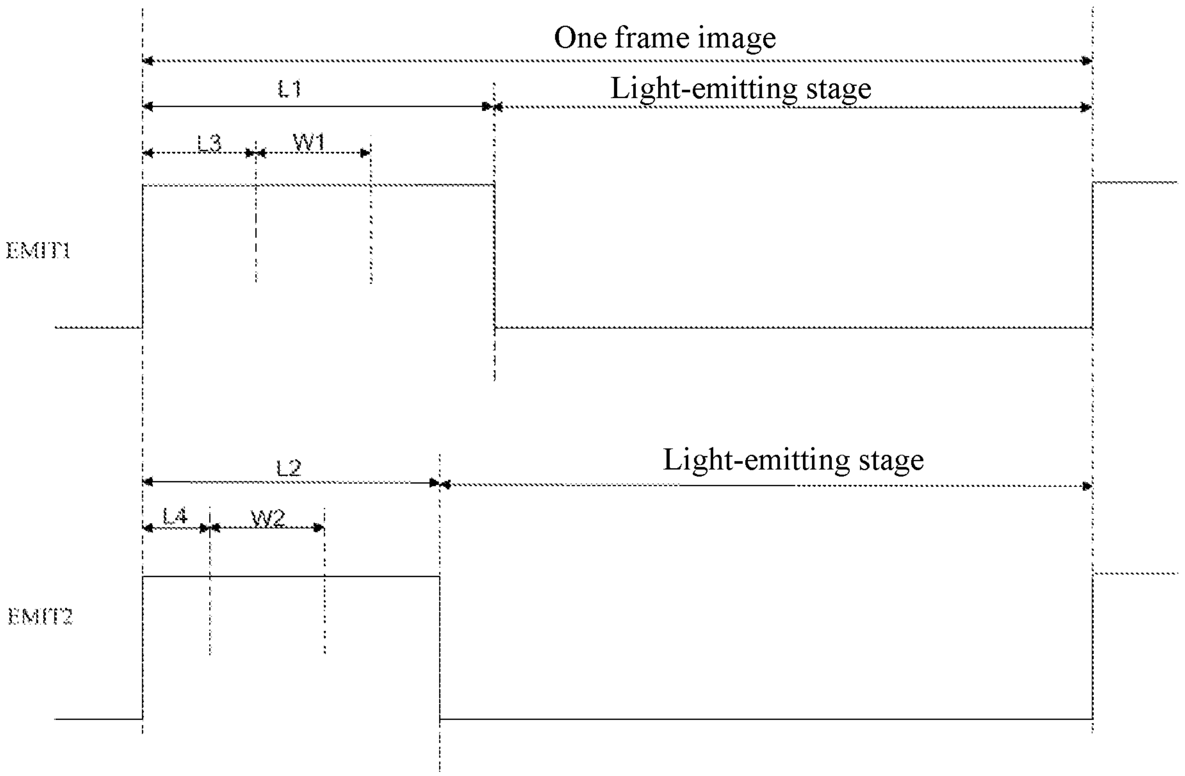
FIG. 8 illustrates another exemplary timing sequence diagram of a first mode and a second mode consistent with disclosed embodiments of the present disclosure.

FIG. 8 illustrates another timing sequence diagram of the first mode and the second mode. In one embodiment, referring to FIG. 8, the time interval from the beginning of the non-light-emitting stage to the beginning of the bias adjustment stage in the first frame may be L3, and the time interval from the beginning of the non-light-emitting stage to the beginning of the bias adjustment stage in the second frame may be L4, where $L3>L4$. In the disclosed embodiments, by adjusting the time intervals from the beginning of the non-light-emitting stage to the beginning of the bias adjustment stage in the first frame and the second frame, the time length of the non-light-emitting stage in the first frame and the time length of the non-light-emitting stage in the second frame may be adjusted. Because after the bias adjustment stage starts, the adjustment of the time length of the non-light-emitting stage is related to the adjustment of the time length of the bias adjustment stage, adjustments of L3 and L4 may be carried out before the bias adjustment stage starts, which may effectively avoid the adverse effect on the time length of the bias adjustment stage, may ensure the display effect in different modes, and may avoid the flickering problem.

Figure 9:
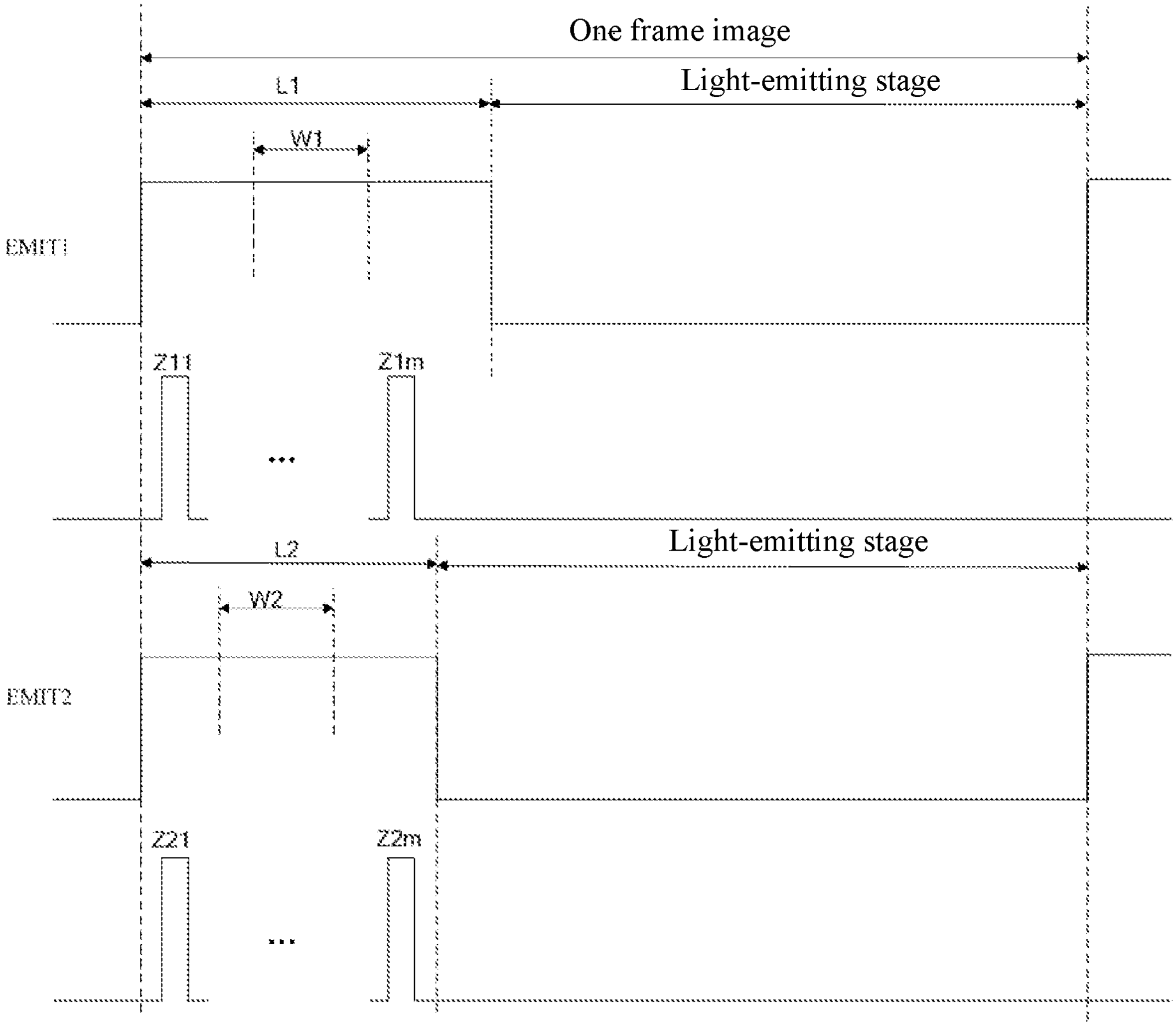
FIG. 9 illustrates another exemplary timing sequence diagram of a first mode and a second mode consistent with disclosed embodiments of the present disclosure.

FIG. 9 illustrates another timing sequence diagram of the first mode and the second mode. In one embodiment, referring to FIG. 9, the non-light-emitting stage may further include a signal adjustment stage. In the signal adjustment stage, the compensation module may be turned on, and the gate of the driving transistor T0 may receive a preset signal to adjust the gate potential of the driving transistor T0. The signal adjustment stage may include M sub-signal adjustment stages. In one embodiment, the signal adjustment stage in the first mode EMIT1 may include M sub-signal adjustment stages from Z11 to Z1m, the signal adjustment stage in the second mode EMIT2 may include M sub-signal adjustment stages from Z21 to Z2m, and $M\geq 1$. When the compensation module 12 is turned on, the display panel may be in the signal adjustment stage.

Figure 10:
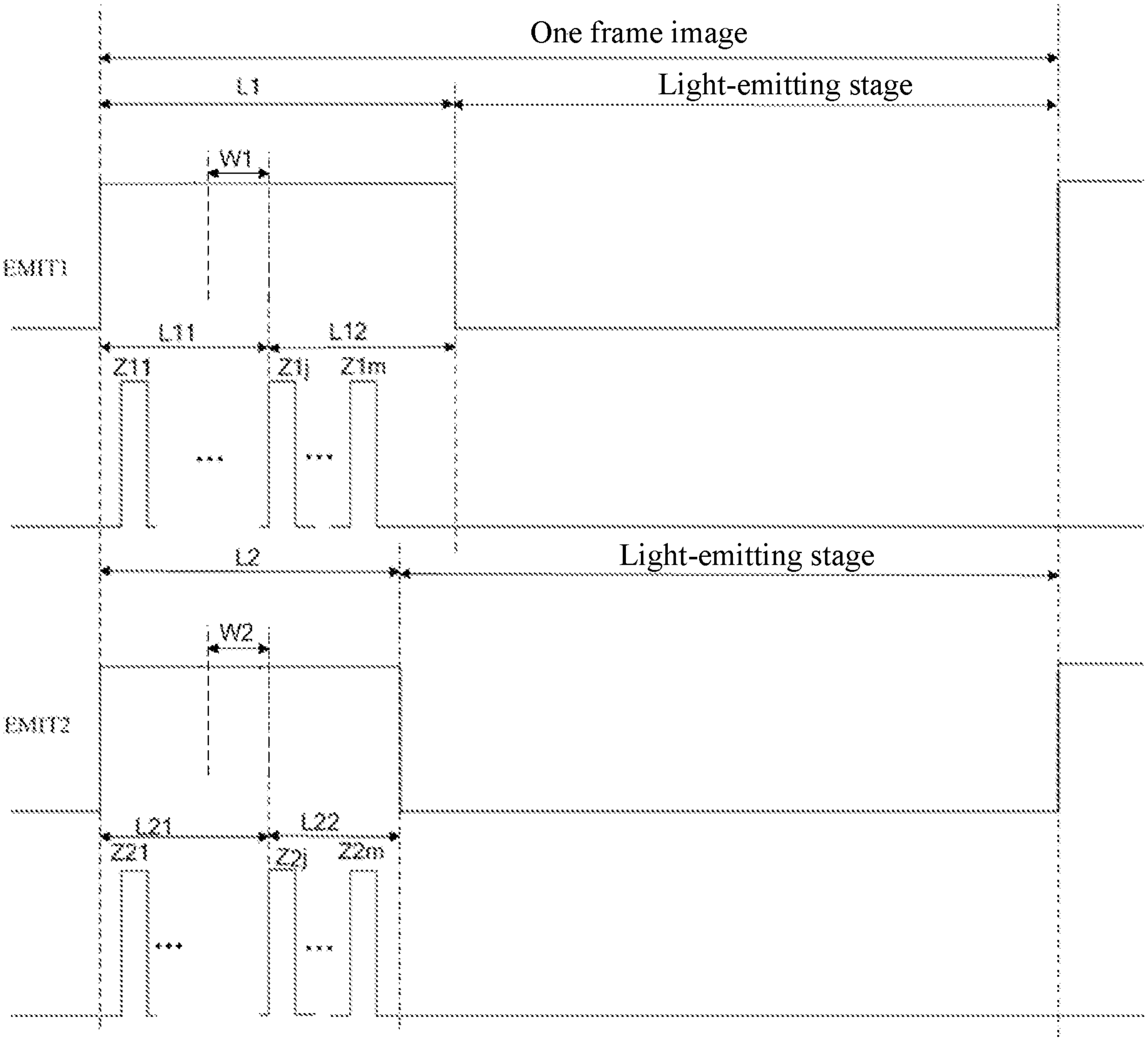
FIG. 10 illustrates another exemplary timing sequence diagram of a first mode and a second mode consistent with disclosed embodiments of the present disclosure.

FIG. 10 illustrates another timing sequence diagram of the first mode and the second mode. In one embodiment, referring to FIG. 10, the bias adjustment stage may be at located a time period from the beginning of the non-light-emitting stage to the beginning of the $j^{th}$ sub-signal adjustment stage, where $1\leq j\leq M$. In the first frame, a time length of a period from the beginning of the non-light-emitting stage to the beginning of the $j^{th}$ sub-signal adjustment stage Z1j may be L11, and a time length of a period from the beginning of the $j^{th}$ sub-signal adjustment stage Z1j to the end of the non-light-emitting stage may be L12. In the second frame, a time length of a period from the beginning of the non-light-emitting stage to the beginning of the $j^{th}$ sub-signal adjustment stage Z2j may be L21, and a time length of a period from the beginning of the $j^{th}$ sub-signal adjustment stage Z2j to the end of the non-light-emitting stage may be L22, where $L11=L21$, and $L12>L22$. In one embodiment, the bias adjustment stage may be performed before the $j^{th}$ sub-signal adjustment stage starts, and $L11=L21$ and $L12>L22$. The time period from the beginning of the $j^{th}$ sub-signal adjustment stage to the end of the non-light-emitting stage may be adjusted, to avoid affecting the time length of the bias adjustment stage.

Figure 11:
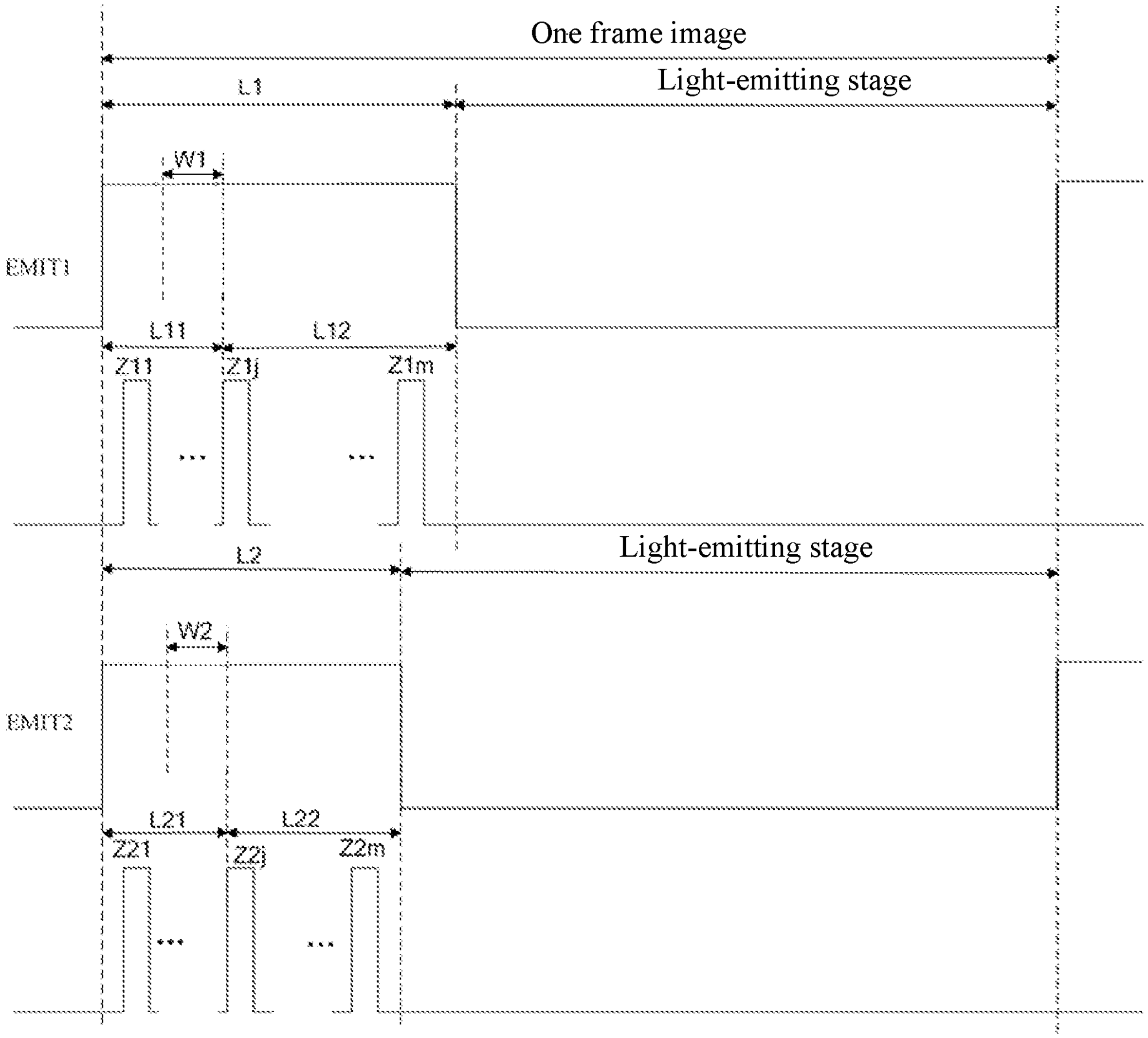
FIG. 11 illustrates another exemplary timing sequence diagram of a first mode and a second mode consistent with disclosed embodiments of the present disclosure.

FIG. 11 illustrates another timing sequence diagram of the first mode and the second mode. In one embodiment, referring to FIG. 11, $L11=L21$, $L12>L22$, and further, $L12>L11$ and/or $L22>L21$. Among the at least one of the first frame and the second frame, a time length of a portion of the non-light-emitting stage containing the bias adjustment stage may be less than a time length of another portion of the non-light-emitting stage excluding the bias adjustment stage. On the one hand, through adjusting the time length of the portion of the non-light-emitting stage excluding the bias adjustment stage, the time length of the non-light-emitting stage in different brightness modes may be adjusted. On the other hand, the uneven display between the high grayscale area and the low grayscale area of the display panel caused by too large time length of the bias adjustment stage may be prevented.

Figure 12:
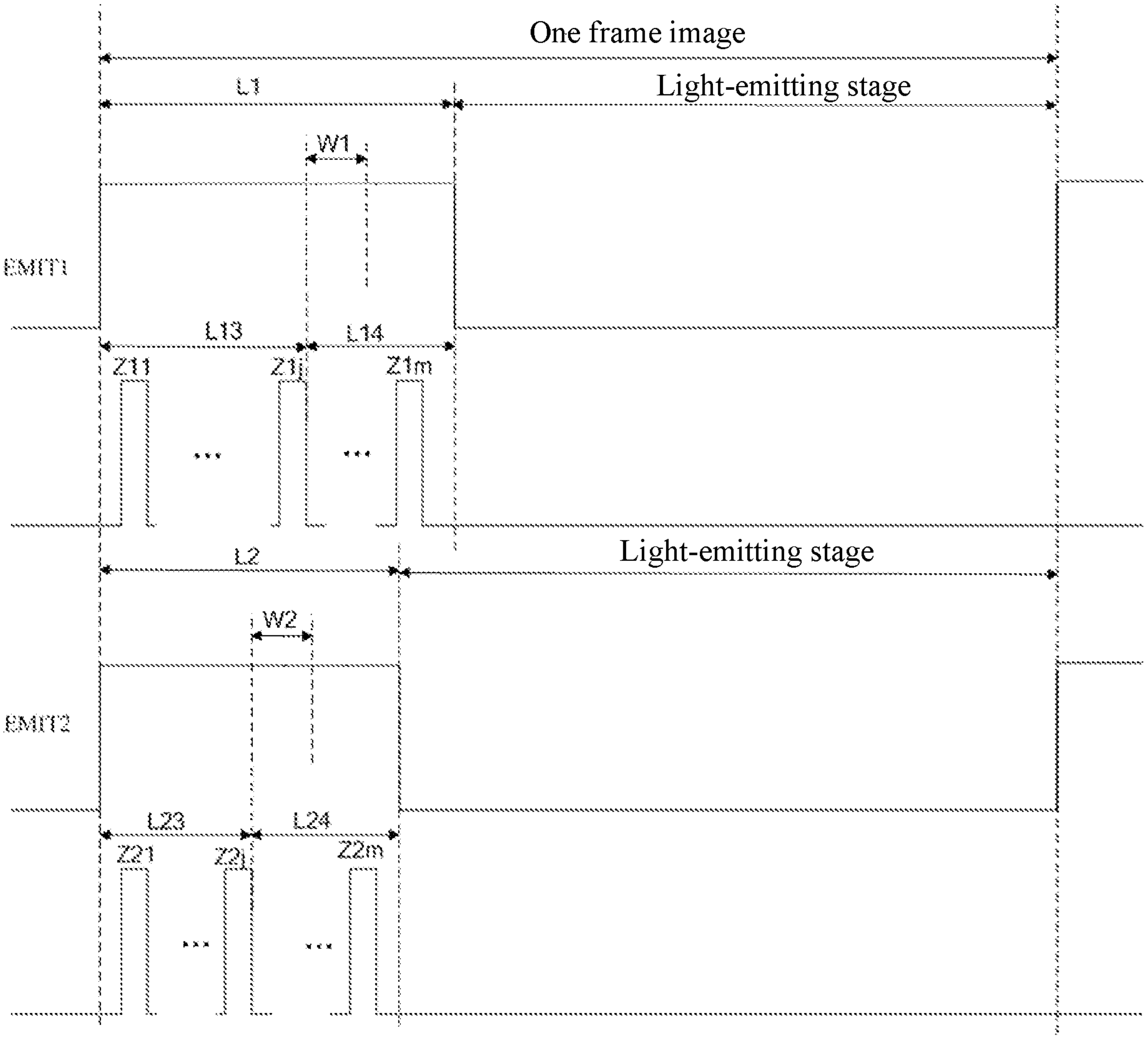
FIG. 12 illustrates another exemplary timing sequence diagram of a first mode and a second mode consistent with disclosed embodiments of the present disclosure.

FIG. 12 illustrates another timing sequence diagram of the first mode and the second mode. In one embodiment, referring to FIG. 12, the bias adjustment stage may be located at a time period from the end of the $j^{th}$ sub-signal adjustment stage to the end of the non-light-emitting stage, where $1\leq j\leq M$. In the first frame, the time length of the period from the beginning of the non-light-emitting stage to the end of the $j^{th}$ sub-signal adjustment stage Z1j may be L13, and the time length of the period from the end of the $j^{th}$ sub-signal adjustment stage Z1j to the end of the non-light-emitting stage may be L14. In the second frame, the time length of the period from the beginning of the non-light-emitting stage to the end of the $j^{th}$ sub-signal adjustment stage Z2j may be L23, and the time length of the period from the end of the $j^{th}$ sub-signal adjustment stage Z2j to the end of the non-light-emitting stage may be L24, where $L13>L23$ and $L14=L24$.

In the disclosed embodiments, the bias adjustment stage may be at the time period from the end of the $j^{th}$ sub-signal adjustment stage to the end of the non-light-emitting stage, where $L13>L23$ and $L14=L24$. Therefore, the time length of the portion of the non-light-emitting stage excluding the bias adjustment stage (e.g., the time period from the beginning of the non-light-emitting stage to the end of the $j^{th}$ sub-signal adjustment stage) may be adjusted, while the time length of the portion of the non-light-emitting stage containing the bias adjustment stage (e.g., the time period from the end of the $j^{th}$ sub-signal adjustment stage to the end of the non-light-emitting stage) may remain unchanged.

Referring to FIG. 12, in the disclosed embodiments, $L13>L23$, $L14=L24$, and further, $L13>L14$ and/or $L23>L24$. Among the at least one of the first frame and the second frame, the time length of the portion of the non-light-emitting stage containing the bias adjustment stage may be less than the time length of the portion of the non-light-emitting stage excluding the bias adjustment stage. On the one hand, through adjusting the time length of the portion of the non-light-emitting stage excluding the bias adjustment stage, the time length of the non-light-emitting stage in different brightness modes may be adjusted. On the other hand, the uneven display between the high grayscale area and the low grayscale area of the display panel caused by too large time length of the bias adjustment stage may be prevented.

Figure 13:
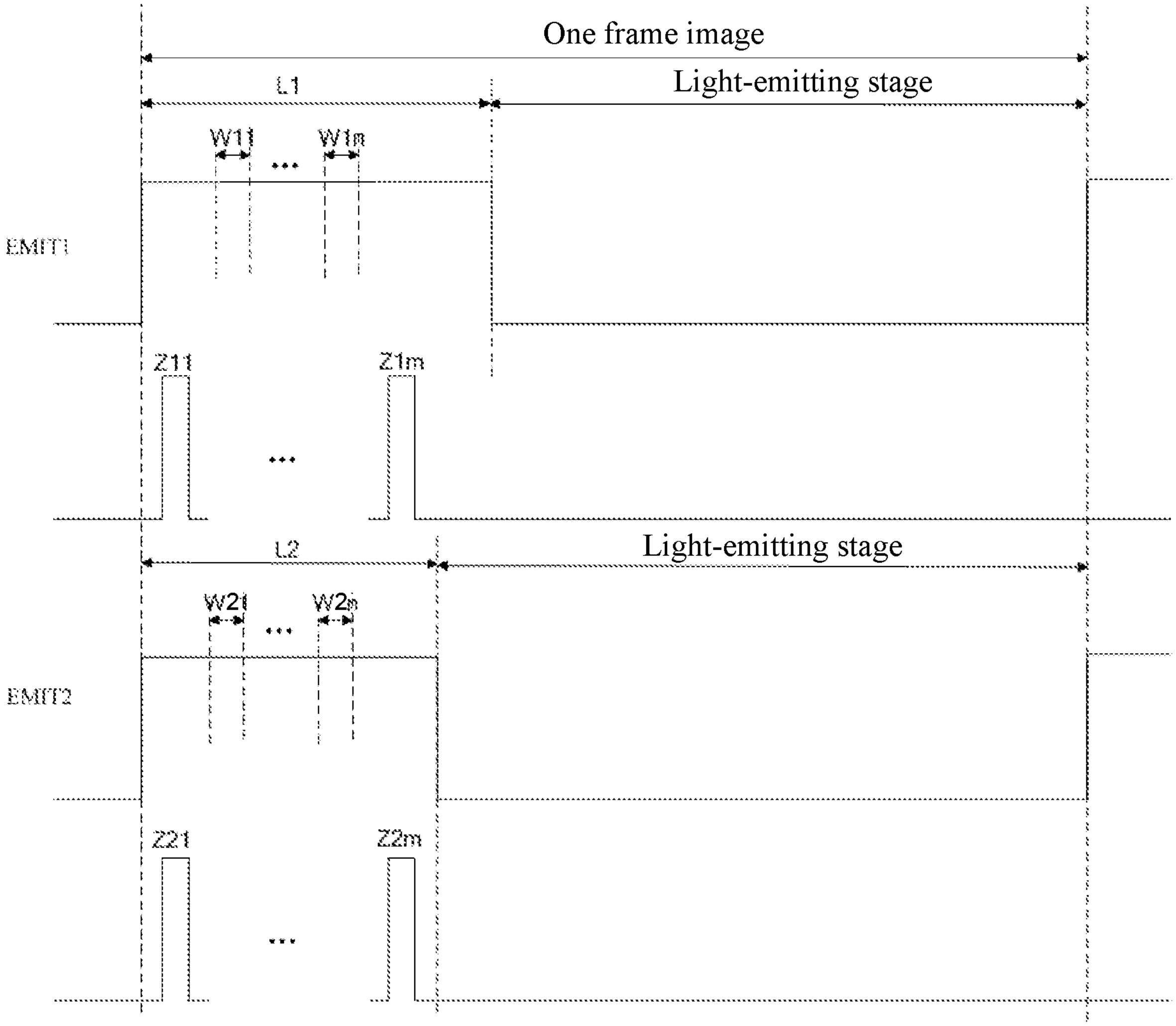
FIG. 13 illustrates another exemplary timing sequence diagram of a first mode and a second mode consistent with disclosed embodiments of the present disclosure.

FIG. 13 illustrates another timing sequence diagram of the first mode and the second mode. In one embodiment, referring to FIG. 13, on the basis of the embodiment associated with FIG. 9, the bias adjustment stage may include N sub-bias adjustment stages. The time lengths of the N sub-bias adjustment stages contained in the bias adjustment stage in the first frame may include a time length W11 of the first sub-bias adjustment stage to a time length W1n of the $N^{th}$ sub-bias adjustment stage, respectively. The time lengths of the N sub-bias adjustment stages contained in the bias adjustment stage in the second frame may include a time length W21 of the first sub-bias adjustment stage to a time length W2n of the $N^{th}$ sub-bias adjustment stage, respectively, where N≥1. At least one sub-bias adjustment stage may start after the first sub-signal adjustment stage ends. The total time length of the sub-bias adjustment stages starting from the end of the first sub-signal adjustment stage Z11 in the first frame may be W10, and the total time length of the sub-bias adjustment stages starting from the end of the first sub-signal adjustment stage Z21 in the second frame may be W20, where W10=W20.

Referring to FIG. 13, in the first frame, the entire sub-bias adjustment stages may start after the first sub-signal adjustment stage Z11 ends. In other words, W10 may be equal to W1. In the second frame, the entire sub-bias adjustment stages may start after the first sub-signal adjustment stage Z21 ends. In other words, W20 may be equal to W2. It should be noted that the quantity of sub-bias adjustment stages starting after the first sub-signal adjustment stage in the first frame and the second frame may not be limited by the present disclosure, and may be determined according to practical applications.

The specific structure of the pixel circuit in the present disclosure may be described in more detail below.

Figure 14:
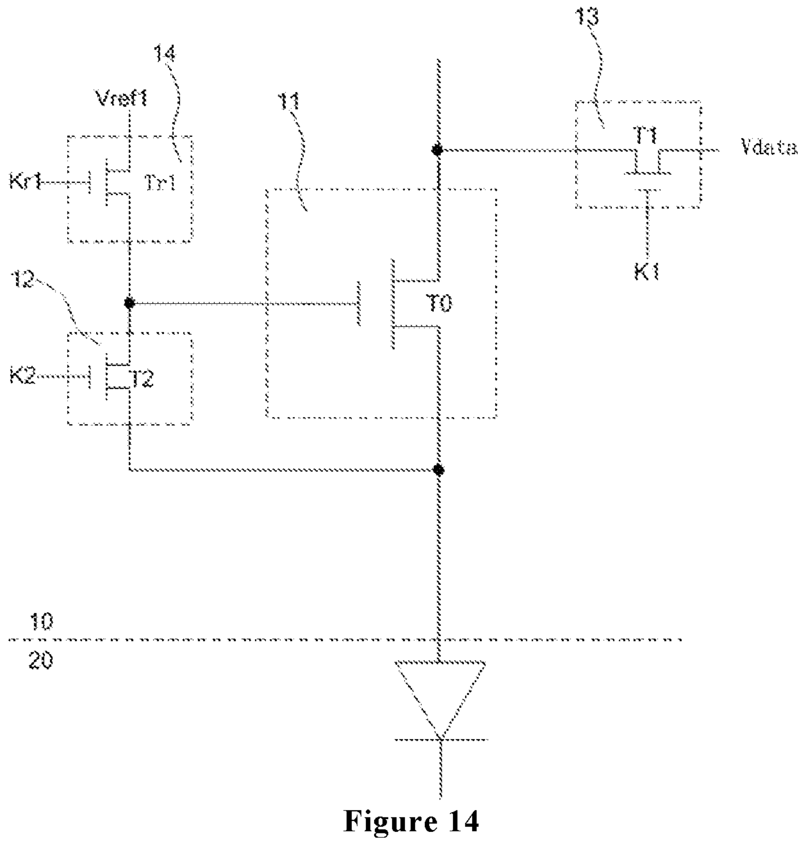
FIG. 14 illustrates a schematic diagram of another exemplary pixel circuit consistent with disclosed embodiments of the present disclosure.

FIG. 14 illustrates a schematic diagram of another pixel circuit consistent with disclosed embodiments of the present disclosure. Referring to FIG. 14, the pixel circuit 10 may further include a data writing module 13 and a reset module 14. The data writing module 13 may be connected to the source of the driving transistor T0, and may be configured to provide a data signal Vdata for the driving module 11. The reset module 14 may be connected to the gate of the driving transistor T0, and may be configured to provide a reset signal Vref1 to the gate of the driving transistor T0. In the present disclosure, the signal adjustment stage may include M sub-signal adjustment stages, where M=1. In other words, the signal adjustment stage may merely include one first sub-signal adjustment stage, and the preset signal may be the data signal Vdata. In the signal adjustment stage, the data writing module 13 may be turned on, and the data signal terminal may provide the data signal Vdata to the gate of the driving transistor T0 through the data writing module 13, the driving module 11, and the compensation module 12.

In the circuit illustrated in FIG. 14, the data writing module 13 may include a first transistor T1. A first electrode of the first transistor T1 may be connected to the data signal Vdata, a second electrode of the first transistor T1 may be connected to the source of the driving transistor T0, and a gate of the first transistor T1 may be connected to the first scanning signal K1. In the bias adjustment stage, the first scanning signal K1 may control the first transistor T1 to be turned on, to transmit the bias adjustment signal to the driving transistor T0. In view of this, the bias adjustment signal may be the current data signal of the data line connected to the pixel circuit, or may be the data signal transmitted in the last frame, or may be any other signal, which may not be specifically limited by the present disclosure.

In the circuit illustrated in FIG. 14, the compensation module 12 may include a second transistor T2. A first electrode of the second transistor T2 may be connected to the drain of the driving transistor T0, a second electrode of the second transistor T2 may be connected to the gate of the driving transistor T0, and a gate of the second transistor T2 may be connected to a second scanning signal K2. In one embodiment, the second transistor T2 may be an oxide semiconductor transistor. The leakage current of the oxide semiconductor transistor may be substantially small, which may facilitate to stabilize the potential of the driving transistor. Similarly, the driving transistor T0 may be an oxide semiconductor transistor, and specifically, may be an indium gallium zinc oxide (IGZO) semiconductor transistor. The driving transistor T0 may be featured with advantages such as high mobility, low leakage current, desired uniformity, transparency, simple manufacturing process, etc.

In the circuit illustrated in FIG. 14, the reset module 14 may include a reset transistor Tr1. A first electrode of the reset transistor Tr1 may be connected to the reset signal Vref1, a second electrode of the reset transistor Tr1 may be connected to the gate of the driving transistor T0, and a gate of the reset transistor Tr1 may be connected to a reset scanning signal Kr1.

In the circuit illustrated in FIG. 14, the second scanning signal K2 may be a pulse signal. When the second scanning signal K2 outputs an effective pulse, the path between the first electrode and the second electrode of the second transistor T2 may be controlled to conduct, thereby compensating the threshold voltage of the driving transistor T0. In the disclosed embodiments, the pixel circuit 10 may include a bias adjustment stage. In the bias adjustment stage, the second scanning signal K2 may output an invalid pulse to control the second transistor T2 to be turned off. Moreover, the pixel circuit 10 may further include a signal adjustment stage. The second scanning signal K2 may output an effective pulse to control the path between the first electrode and the second electrode of the second transistor T2 to conduct, such that the gate of the driving transistor T0 may receive the preset signal. The signal adjustment stage may merely include one sub-signal adjustment stage, and the preset signal received by the gate of the driving transistor T0 may be the data signal Vdata.

Figure 15:
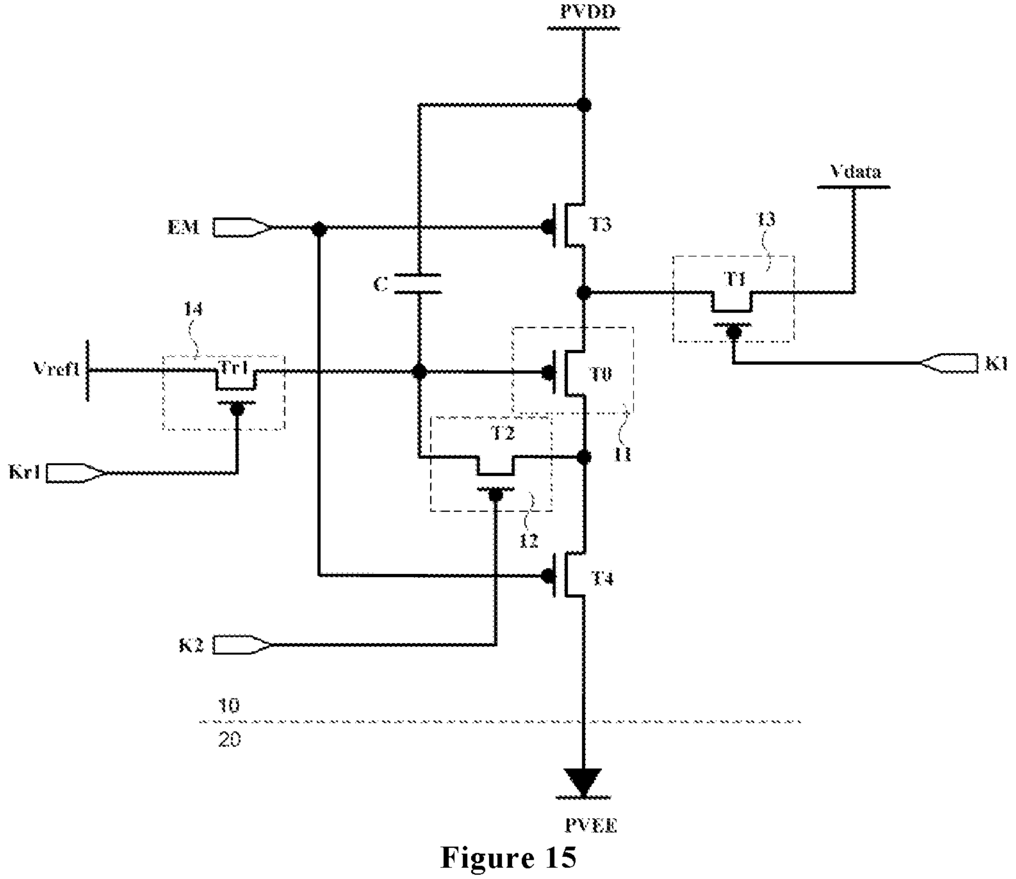
FIG. 15 illustrates a schematic diagram of another exemplary pixel circuit consistent with disclosed embodiments of the present disclosure.

In one embodiment, the driving transistor T0 may be a P-type transistor. FIG. 15 illustrates a schematic diagram of another pixel circuit consistent with disclosed embodiments of the present disclosure. The pixel circuit illustrated in FIG. 15 may be on the basis of the pixel circuit illustrated in FIG. 14. Referring to FIG. 15, the pixel circuit may further include a third transistor T3 and a fourth transistor T4 that control light emission. Both the gates of the third transistor T3 and the fourth transistor T4 may receive the light-emitting control signal EM. A first electrode of the third transistor T3 may receive the first power signal PVDD, and a second electrode of the third transistor T3 may be connected to the source of the driving transistor T0. A first electrode of the fourth transistor T4 may be connected to the drain of the driving transistor T0, and a second electrode of the fourth transistor T4 may be connected to one end of the light-emitting element 20, and another end of the light-emitting element 20 may be connected to the second power signal PVEE.

The light-emitting control signal EM may be a pulse signal. When the light-emitting control signal EM is an effective pulse, the third transistor T3 and the fourth transistor T4 may be controlled to be turned on, and the light-emitting element 20 may be in a light-emitting stage. When the light-emitting control signal EM is an invalid pulse, the third transistor T3 and the fourth transistor T4 may be controlled to be turned off, and the light-emitting element 20 may be in a non-light-emitting stage. The pixel circuit may further include a holding capacitor C configured to maintain a potential of the node. A first terminal of the holding capacitor C may receive the first power signal PVDD, and a second terminal of the holding capacitor C may be connected to the gate of the driving transistor T0.

Figure 16:
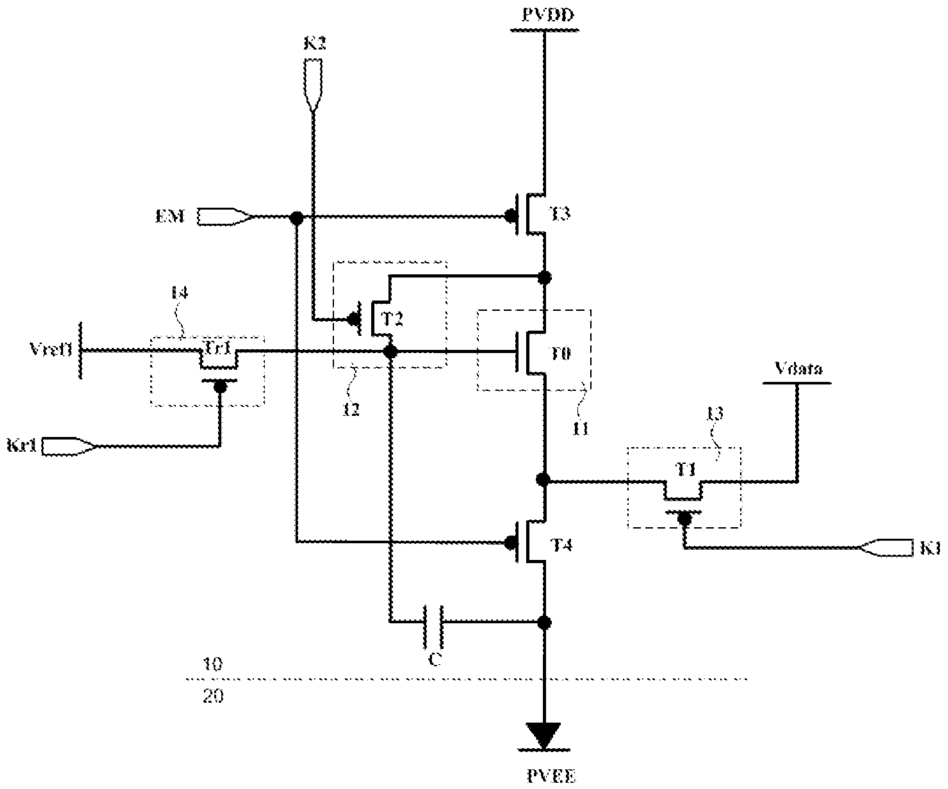
FIG. 16 illustrates a schematic diagram of another exemplary pixel circuit consistent with disclosed embodiments of the present disclosure.

In one embodiment, the driving transistor T0 may be an N-type transistor. FIG. 16 illustrates a schematic diagram of another pixel circuit consistent with disclosed embodiments of the present disclosure. The pixel circuit illustrated in FIG. 16 may be on the basis of the pixel circuit illustrated in FIG. 14. Referring to FIG. 16, the pixel circuit may further include the third transistor T3 and the fourth transistor T4 that control light emission. Both the gates of the third transistor T3 and the fourth transistor T4 may receive the light-emitting control signal EM. The first electrode of the third transistor T3 may receive the first power signal PVDD, and the second electrode of the third transistor T3 may be connected to the drain of the driving transistor T0. The first electrode of the fourth transistor T4 may be connected to the source of the driving transistor T0, and the second electrode of the fourth transistor T4 may be connected to one end of the light-emitting element 20, and another end of the light-emitting element 20 may be connected to the second power signal PVEE.

The light-emitting control signal EM may be a pulse signal. When the light-emitting control signal EM is an effective pulse, the light-emitting element 20 may be in a light-emitting stage. When the light-emitting control signal EM is an invalid pulse, the light-emitting element 20 may be in a non-light-emitting stage. The pixel circuit may further include a holding capacitor C configured to maintain a potential of the node. A first terminal of the holding capacitor C may be connected to the source of the driving transistor T0, or the first terminal of the holding capacitor C may be connected to the light-emitting element 20, and a second terminal of the holding capacitor C may be connected to the gate of the driving transistor T0.

Figure 17:
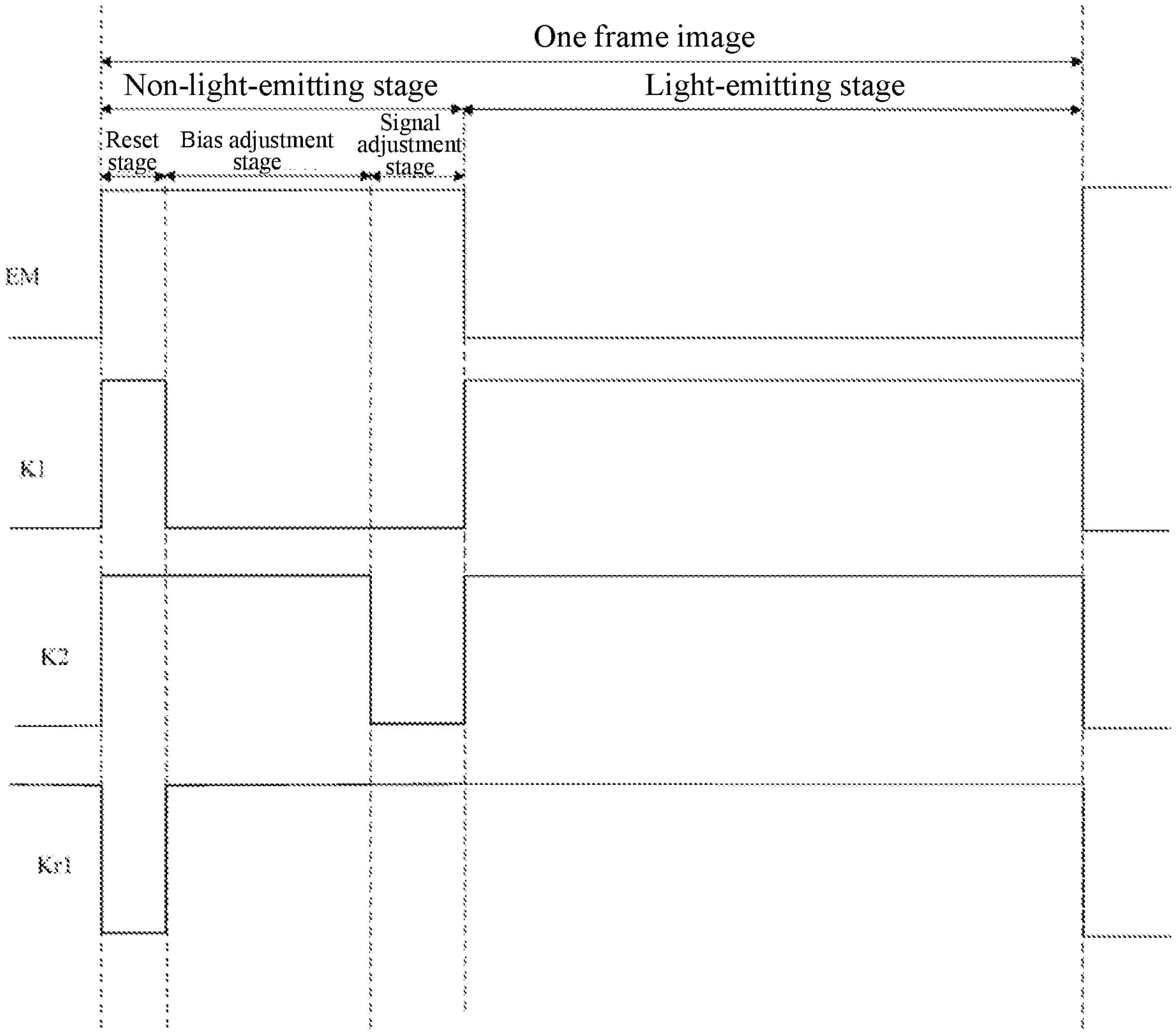
FIG. 17 illustrates an exemplary timing sequence diagram consistent with disclosed embodiments of the present disclosure.

FIG. 17 illustrates a timing sequence diagram of a pixel circuit illustrated in any one of FIG. 15 and FIG. 16. Referring to FIG. 17, first, the light-emitting control signal EM may be an invalid pulse, such that the pixel circuit 10 may control the light-emitting element 20 to be in a non-light-emitting stage. The non-light-emitting stage may include a reset stage, a bias adjustment stage, and a signal adjustment stage. In the reset stage, the reset scanning signal Kr1 may control the reset transistor Tr1 to be turned on, such that the reset signal Vref1 may be transmitted to the gate of the driving transistor T0. In the bias adjustment stage, the second scanning signal K2 may be an invalid pulse to control the second transistor T2 to be turned off. At the same time, the first scanning signal K1 may control the first transistor T1 to be turned on, such that the bias adjustment signal may be transmitted to the source of the driving transistor T0, and then may be transmitted to the drain of the driving transistor T0 through the driving transistor T0, to adjust the bias state of the driving transistor T0. The bias adjustment signal may be provided through a port of the data signal Vdata.

In the signal adjustment stage, the second scanning signal K2 may be an effective pulse to control the second transistor T2 to be turned on. At the same time, the first scanning signal K1 may control the first transistor T1 to be turned on, such that the data signal Vdata multiplexed as a preset signal may be transmitted to the gate of the driving transistor T0 through the first transistor T1, the driving transistor T0, and the second transistor T2. Then, the light-emitting control signal EM may be an effective pulse, such that the pixel circuit 10 may control the light-emitting element 20 to be in the light-emitting stage. It should be noted that the light-emitting control signal EM may be a single control signal to simultaneously control two transistors. In another embodiment, the light-emitting control signal EM may be divided into two sub-light-emitting control signals, to control respective transistors, respectively. The time length of one of the two sub-light-emitting control signals which has a larger time length of the outputted invalid pulse may be the time length of the non-light-emitting stage.

Figure 18:
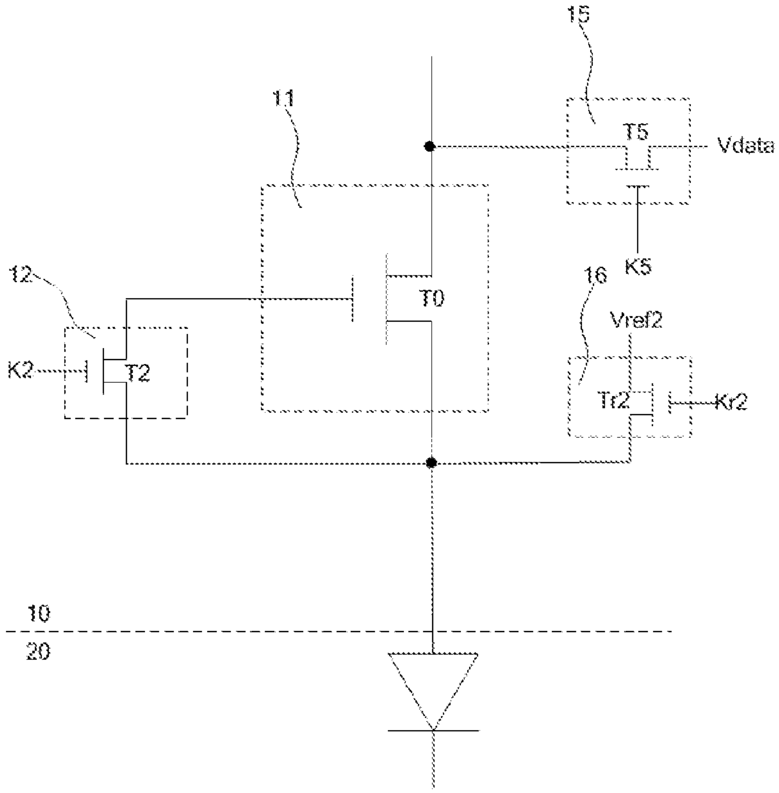
FIG. 18 illustrates a schematic diagram of another exemplary pixel circuit consistent with disclosed embodiments of the present disclosure.

FIG. 18 illustrates a timing sequence diagram of another pixel circuit. Referring to FIG. 18, the pixel circuit may further include a data writing module 15 and a reset module 16. The data writing module 15 may be connected to the source of the driving transistor T0, and may be configured to provide the data signal Vdata for the driving module 11. The reset module 16 may be connected to the drain of the driving transistor T0, and may be configured to provide the reset signal Vref2 to the gate of the driving transistor T0. In the present disclosure, the signal adjustment stage may include M sub-signal adjustment stages, where M=2. In the first sub-signal adjustment stage, the preset signal may be the reset signal Vref2, and in the second sub-signal adjustment stage, the preset signal may be the data signal Vdata. In the first sub-signal adjustment stage, the reset module 16 may be turned on, and the reset signal terminal may provide the reset signal Vref2 to the gate of the driving transistor T0 through the reset module 16 and the compensation module 12. In the second sub-signal adjustment stage, the data writing module 15 may be turned on, and the data signal terminal may provide the data signal Vdata to the gate of the driving transistor T0 through the data writing module 15, the driving module 11 and the compensation module 12.

In the circuit illustrated in FIG. 18, the data writing module 15 may include a fifth transistor T5. A first electrode of the fifth transistor T5 may receive the data signal Vdata, a second electrode of the fifth transistor T5 may be connected to the source of the driving transistor T0, and a gate of the fifth transistor T5 may be connected to the fifth scanning signal K5.

In the circuit illustrated in FIG. 18, the compensation module 12 may include the second transistor T2. The first electrode of the second transistor T2 may be connected to the drain of the driving transistor T0, the second electrode of the second transistor T2 may be connected to the gate of the driving transistor T0, and the gate of the driving transistor T2 may receive the second scanning signal K2. In one embodiment, the second transistor T2 may be an oxide semiconductor transistor. The leakage current of the oxide semiconductor transistor may be substantially small, which may facilitate to stabilize the potential of the driving transistor. Similarly, the driving transistor T0 may be an oxide semiconductor transistor, and specifically, may be an indium gallium zinc oxide (IGZO) semiconductor transistor. The driving transistor T0 may be featured with advantages such as high mobility, low leakage current, desired uniformity, transparency, simple manufacturing process, etc.

In the circuit illustrated in FIG. 18, the reset module 16 may include a reset transistor Tr2. A first electrode of the reset transistor Tr2 may receive the reset signal Vref2, a second electrode of the reset transistor Tr2 may be connected to the drain of the driving transistor T0, and a gate of the reset transistor Tr2 may receive the reset scanning signal Kr2.

In the circuit illustrated in FIG. 18, the second scanning signal K2 may be a pulse signal. When the second scanning signal K2 is an effective pulse, the path between the first electrode and the second electrode of the second transistor T2 may be controlled to conduct. In the disclosed embodiments, the pixel circuit 10 may include a bias adjustment stage. In the bias adjustment stage, the second scanning signal K2 may be an invalid pulse to control the second transistor T2 to be turned off. The reset transistor Tr2 may be controlled to be turned on according to the reset scanning signal Kr2. The reset transistor Tr2 may transmit the bias adjustment signal to the drain of the driving transistor T0, where the bias adjustment signal may be provided by the port of the reset signal Vref2. In other words, the reset signal Vref2 may be a signal with different potentials in the reset stage and the bias adjustment stage. For example, when the driving transistor is a PMOS transistor, the Vref2 signal may be a low-level signal in the reset stage and a high-level signal in the bias adjustment stage. When the driving transistor is an NMOS transistor, the Vref2 signal may be a high-level signal in the reset stage, and a low-level signal in the bias adjustment stage.

Moreover, the pixel circuit 10 may further include a signal adjustment stage. The signal adjustment stage may include a first sub-signal adjustment stage and a second sub-signal adjustment stage. In the first sub-signal adjustment stage, the second scanning signal K2 may be an effective pulse to control the path between the first electrode and the second electrode of the second transistor T2 to conduct. At the same time, the reset scanning signal Kr2 may control the reset transistor Tr2 to be turned on, and the reset signal Vref2 may be transmitted to the gate of the driving transistor T0 through the reset transistor Tr2 and the second transistor T2. In the second sub-signal adjustment stage, the second scanning signal K2 may be an effective pulse to control the path between the first electrode and the second electrode of the second transistor T2 to conduct, the fifth transistor T5 and the driving transistor T0 may be turned on, and the data signal Vdata may be transmitted to the gate of the driving transistor T0 through the fifth transistor T5, the driving transistor T0, and the second transistor T2. In other words, in the first sub-signal adjustment stage, the preset signal received by the gate of the driving transistor T0 may be the reset signal Vref2, and in the second sub-signal adjustment stage, the preset signal received by the gate of the driving transistor T0 may be the data signal Vdata.

Figure 19:
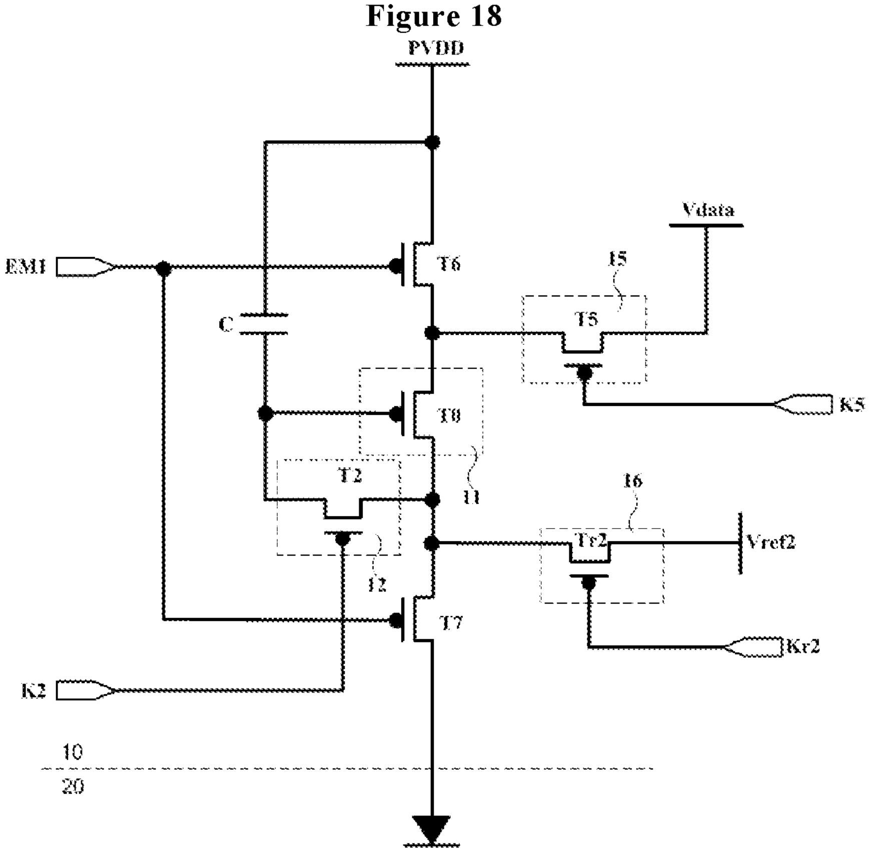
FIG. 19 illustrates a schematic diagram of another exemplary pixel circuit consistent with disclosed embodiments of the present disclosure.

In one embodiment, the driving transistor T0 may be a P-type transistor. FIG. 19 illustrates a timing sequence diagram of another pixel circuit. The pixel circuit illustrated in FIG. 19 may be on the basis of the pixel circuit illustrated in FIG. 18. Referring to FIG. 19, the pixel circuit may further include a sixth transistor T6 and a seventh transistor T7 for controlling the light emission. Both the gates of the sixth transistor T6 and the seventh transistor T7 may receive the light-emitting control signal EM1. A first electrode of the sixth transistor T6 may receive the first power signal PVDD, and a second electrode of the sixth transistor T6 may be connected to the source of the driving transistor T0. A first electrode of the seventh transistor T7 may be connected to the drain of the driving transistor T0, a second electrode of the seventh transistor T7 may be connected to one end of the light-emitting element 20, and another end of the light-emitting element 20 may receive the second power signal PVEE.

The light-emitting control signal EM1 may be a pulse signal. When the light-emitting control signal EM1 is an effective pulse, the light-emitting element 20 may be in a light-emitting stage. When the light-emitting control signal EM1 is an invalid pulse, the light-emitting element 20 may be in a non-light-emitting stage. The pixel circuit may further include a holding capacitor C configured to maintain a potential of the node. A first terminal of the holding capacitor C may receive the first power signal PVDD, and a second terminal of the holding capacitor C may be connected to the gate of the driving transistor T0.

Figure 20:
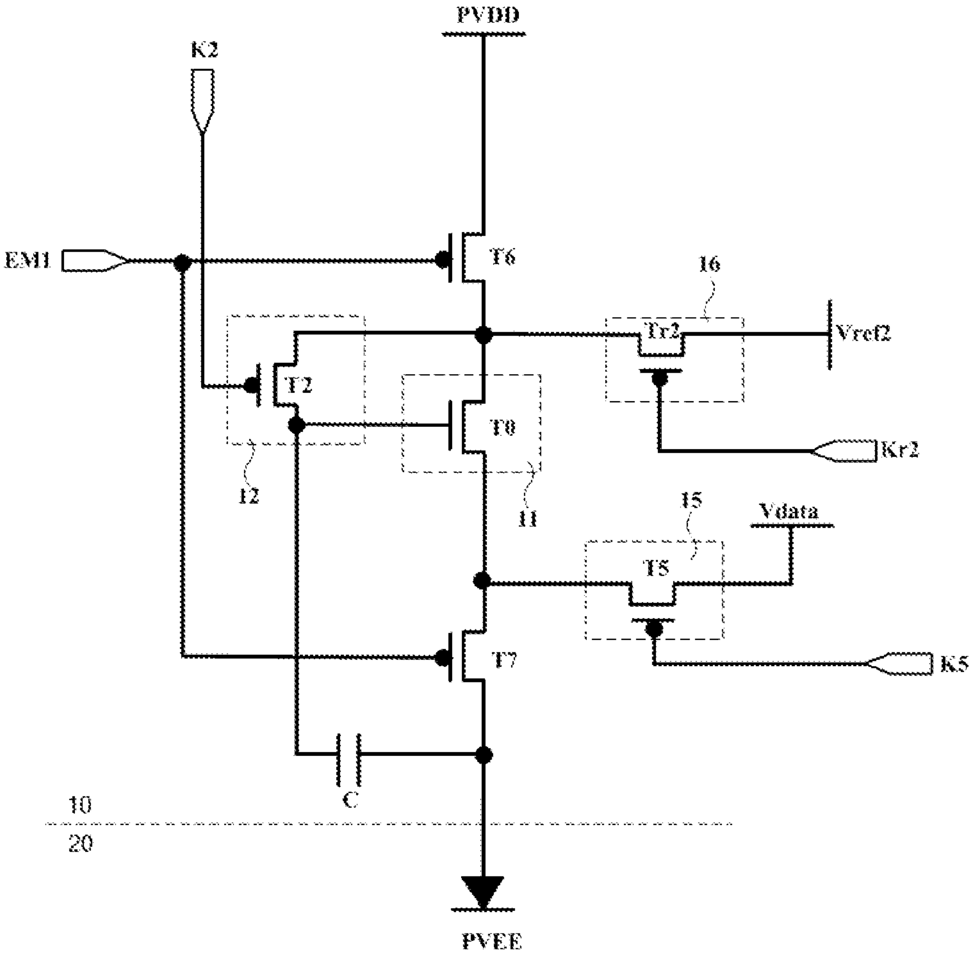
FIG. 20 illustrates a schematic diagram of another exemplary pixel circuit consistent with disclosed embodiments of the present disclosure.

In one embodiment, the driving transistor T0 may be an N-type transistor. FIG. 20 illustrates a timing sequence diagram of another pixel circuit. The pixel circuit illustrated in FIG. 20 may be on the basis of the pixel circuit illustrated in FIG. 18. Referring to FIG. 20, the pixel circuit may further include the sixth transistor T6 and the seventh transistor T7 for controlling the light emission. Both the gates of the sixth transistor T6 and the seventh transistor T7 may receive the light-emitting control signal EM1. A first electrode of the sixth transistor T6 may receive the first power signal PVDD, and a second electrode of the sixth transistor T6 may be connected to the drain of the driving transistor T0. A first electrode of the seventh transistor T7 may be connected to the source of the driving transistor T0, a second electrode of the seventh transistor T7 may be connected to one end of the light-emitting element 20, and another end of the light-emitting element 20 may receive the second power signal PVEE.

The light-emitting control signal EM1 may be a pulse signal. When the light-emitting control signal EM1 is an effective pulse, both the six transistor T6 and the seventh transistor T7 may be turned on, and the light-emitting element 20 may be in a light-emitting stage. When the light-emitting control signal EM1 is an invalid pulse, both the six transistor T6 and the seventh transistor T7 may be turned off, and the light-emitting element 20 may be in a non-light-emitting stage. The pixel circuit may further include a holding capacitor C configured to maintain a potential of the node. A first terminal of the holding capacitor C may be connected to the source of the driving transistor T0, or the first terminal of the holding capacitor C may be connected to the light-emitting element 20, and a second terminal of the holding capacitor C may be connected to the gate of the driving transistor T0.

Figure 21:
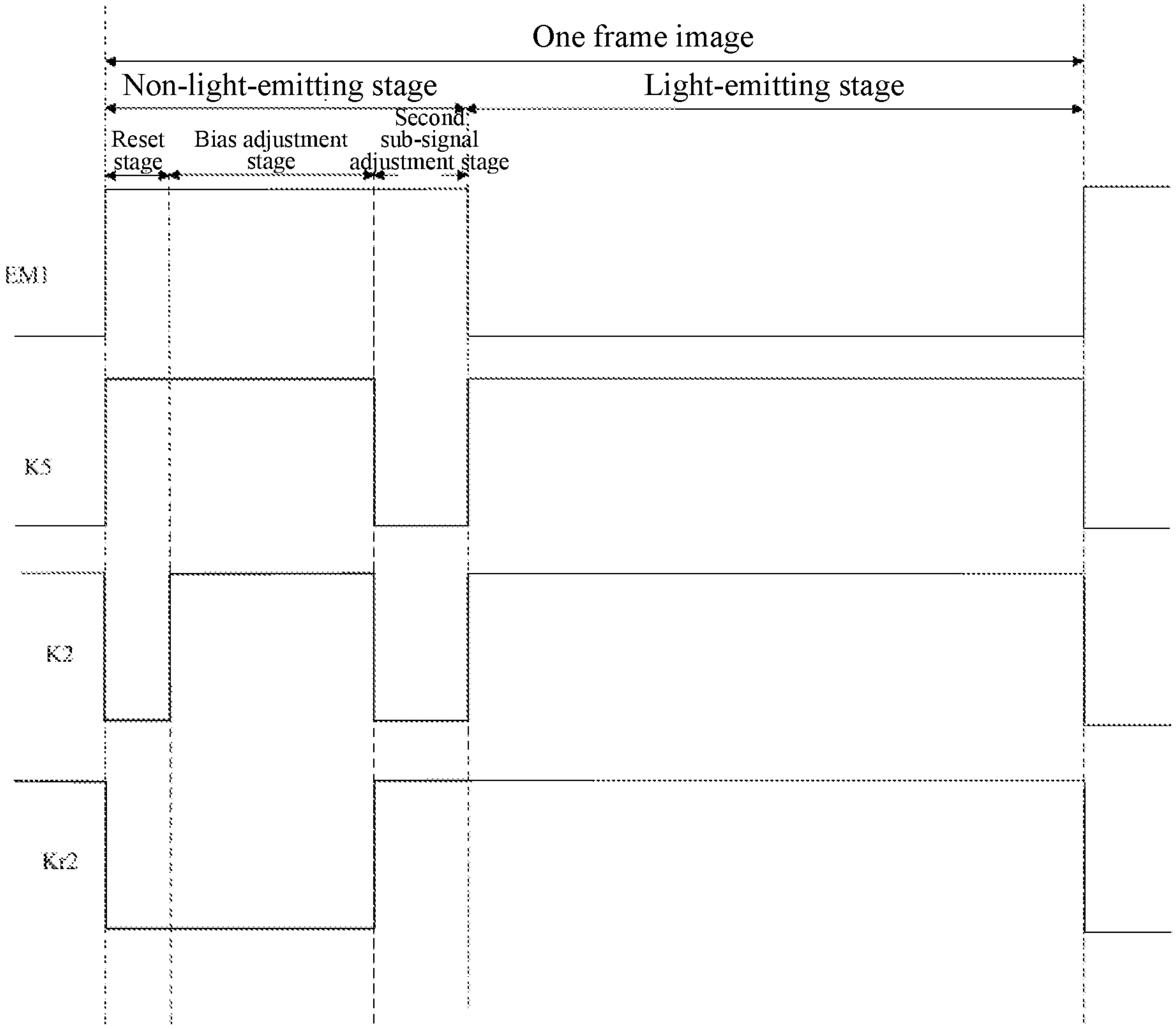
FIG. 21 illustrates another exemplary timing sequence diagram consistent with disclosed embodiments of the present disclosure.

FIG. 21 illustrates a timing sequence diagram of a pixel circuit illustrated in any one of FIG. 19 and FIG. 20. Referring to FIG. 21, first, the light-emitting control signal EM1 may be an invalid pulse, such that the pixel circuit 10 may control the light-emitting element 20 to be in a non-light-emitting stage. The non-light-emitting stage may include a reset stage (the reset stage may be the first sub-signal adjustment stage), a bias adjustment stage, and a second sub-signal adjustment stage. In the reset stage, the reset scanning signal Kr2 may control the reset transistor Tr2 to be turned on, and at the same time, the second scanning signal K2 may be an effective pulse to control the second transistor T2 to be turned on, such that the reset signal Vref2 may be transmitted to the gate of the driving transistor T0 through the reset transistor Tr2 and the second transistor T2.

In the bias adjustment stage, the second scanning signal K2 may be an invalid pulse to control the second transistor T2 to be turned off, and at the same time, the reset scanning signal Kr2 may control the reset transistor Tr2 to be turned on, such that the bias adjustment signal may be transmitted to the drain of the driving transistor T0, to adjust the bias state of the driving transistor T0. The bias adjustment signal may be provided through a port of the reset signal Vref2. In one embodiment, when the driving transistor T0 is an N-type transistor, the reset signal Vref2 may be at a high-level in the reset stage, and may be at a low-level in the bias adjustment stage. In another embodiment, when the driving transistor T0 is a P-type transistor, the reset signal Vref2 may be at a low-level in the reset stage, and may be at a high-level in the bias adjustment stage.

In the second sub-signal adjustment stage, the second scanning signal K2 may be an effective pulse to control the second transistor T2 to be turned on. At the same time, the fifth scanning signal K5 may control the fifth transistor T5 to be turned on, such that the data signal Vdata multiplexed as a preset signal may be transmitted to the gate of the driving transistor T0 through the fifth transistor T5, the driving transistor T0, and the second transistor T2. Then, the light-emitting control signal EM1 may be an effective pulse, such that the pixel circuit 10 may control the light-emitting element 20 to be in the light-emitting stage. It should be noted that the light-emitting control signal EM1 may be a single control signal to simultaneously control two transistors. In another embodiment, the light-emitting control signal EM1 may be divided into two sub-light-emitting control signals, to control respective transistors, respectively. The time length of one of the two sub-light-emitting control signals which has a larger time length of the outputted invalid pulse may be the time length of the non-light-emitting stage.

Figure 22:
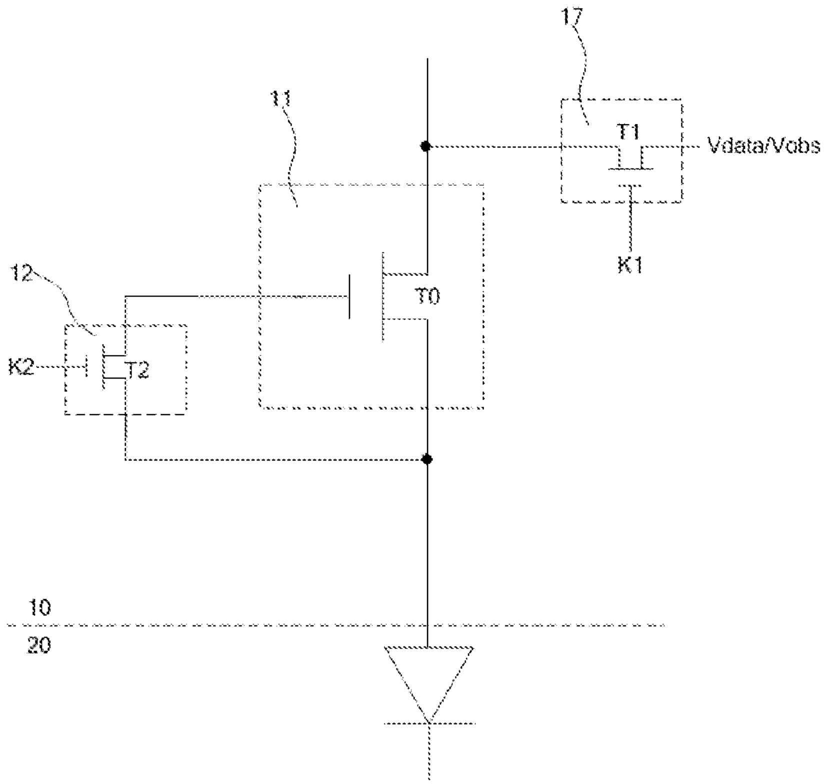
FIG. 22 illustrates a schematic diagram of another exemplary pixel circuit consistent with disclosed embodiments of the present disclosure.

FIG. 22 illustrates a timing sequence diagram of another pixel circuit. Referring to FIG. 22, the pixel circuit may include a data writing module 17. The data writing module 17 may be connected to the source of the driving transistor T0, and may be configured to provide the data signal Vdata for the driving module 11. In the bias adjustment stage, the data writing module 17 may be turned on, the compensation module 12 may be turned off, and the data writing module 17 may write a bias adjustment signal Vobs to the source of the driving transistor T0. The bias adjustment signal Vobs may be transmitted to the drain of the driving transistor T0 through the driving transistor T0.

In the circuit illustrated in FIG. 22, the data writing module 17 may include an eighth transistor T8. A first electrode of the eighth transistor T8 may receive the data signal Vdata, a second electrode of the eighth transistor T8 may be connected to the source of the driving transistor T0, and a gate of the eighth transistor T8 may receive the eighth scanning signal K8.

In the circuit illustrated in FIG. 22, the compensation module 12 may include the second transistor T2. A first electrode of the second transistor T2 may be connected to the drain of the driving transistor T0, a second electrode of the second transistor T2 may be connected to the gate of the driving transistor T0, and a gate of the driving transistor T2 may receive the second scanning signal K2. In one embodiment, the second transistor T2 may be an oxide semiconductor transistor. The leakage current of the oxide semiconductor transistor may be substantially small, which may facilitate to stabilize the potential of the driving transistor. Similarly, the driving transistor T0 may be an oxide semiconductor transistor, and specifically, may be an indium gallium zinc oxide (IGZO) semiconductor transistor. The driving transistor T0 may be featured with advantages such as high mobility, low leakage current, desired uniformity, transparency, simple manufacturing process, etc.

In the circuit illustrated in FIG. 22, the second scanning signal K2 may be a pulse signal. When the second scanning signal K2 is an effective pulse, the path between the first electrode and the second electrode of the second transistor T2 may be controlled to conduct, to compensate a threshold voltage of the driving transistor T0. In the disclosed embodiments, the pixel circuit 10 may include a bias adjustment stage. In the bias adjustment stage, the second scanning signal K2 may be an invalid pulse to control the second transistor T2 to be turned off. An eighth scanning signal K8 may control the eighth transistor T8 to be turned on, such that the bias adjustment signal Vobs may be transmitted to the source of the driving transistor T0, and then the bias adjustment signal Vobs may be transmitted to the drain of the driving transistor T0 due to the conduction of the driving transistor T0.

Figure 23:
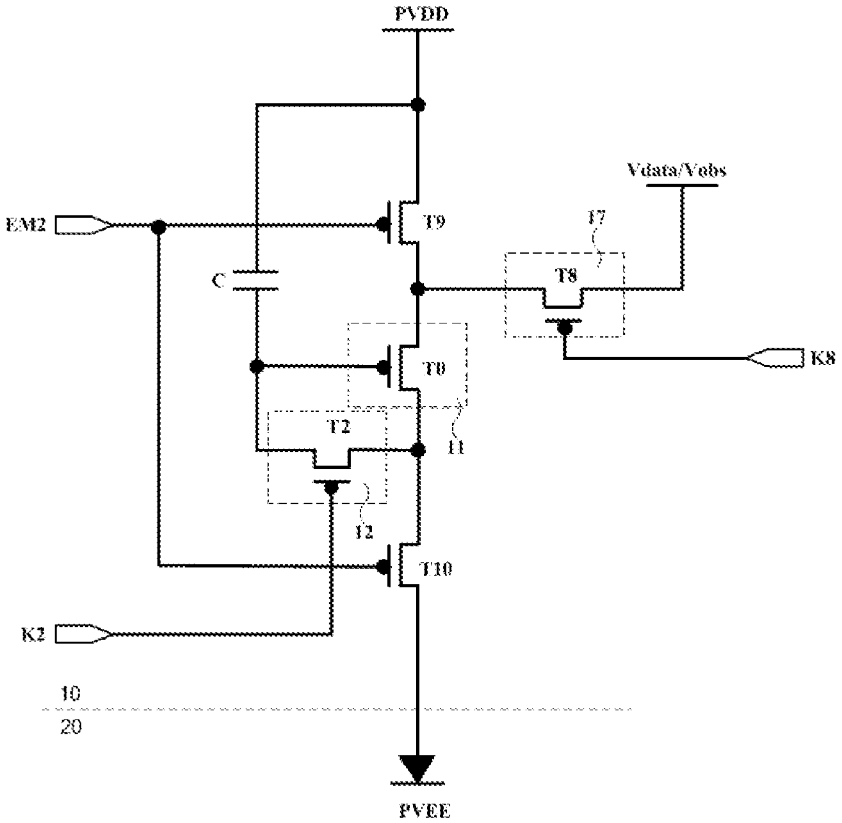
FIG. 23 illustrates a schematic diagram of another exemplary pixel circuit consistent with disclosed embodiments of the present disclosure.

In one embodiment, the driving transistor T0 may be a P-type transistor. FIG. 23 illustrates a timing sequence diagram of another pixel circuit. The pixel circuit illustrated in FIG. 23 may be on the basis of the pixel circuit illustrated in FIG. 22. Referring to FIG. 23, the pixel circuit may further include a ninth transistor T9 and a tenth transistor T10 for controlling the light emission. Both the gates of the ninth transistor T9 and the tenth transistor T10 may receive the light-emitting control signal EM2. A first electrode of the ninth transistor T9 may receive the first power signal PVDD, and a second electrode of the ninth transistor T9 may be connected to the source of the driving transistor T0. A first electrode of the tenth transistor T10 may be connected to the drain of the driving transistor T0, a second electrode of the tenth transistor T10 may be connected to one end of the light-emitting element 20, and another end of the light-emitting element 20 may receive the second power signal PVEE.

The light-emitting control signal EM2 may be a pulse signal. When the light-emitting control signal EM2 is an effective pulse, the ninth transistor T9 and the tenth transistor T10 may be controlled to be turned on, and the light-emitting element 20 may be in a light-emitting stage. When the light-emitting control signal EM2 is an invalid pulse, the ninth transistor T9 and the tenth transistor T10 may be controlled to be turned off, and the light-emitting element 20 may be in a non-light-emitting stage. The pixel circuit may further include a holding capacitor C configured to maintain a potential of the node. A first terminal of the holding capacitor C may receive the first power signal PVDD, and a second terminal of the holding capacitor C may be connected to the gate of the driving transistor T0.

Figure 24:
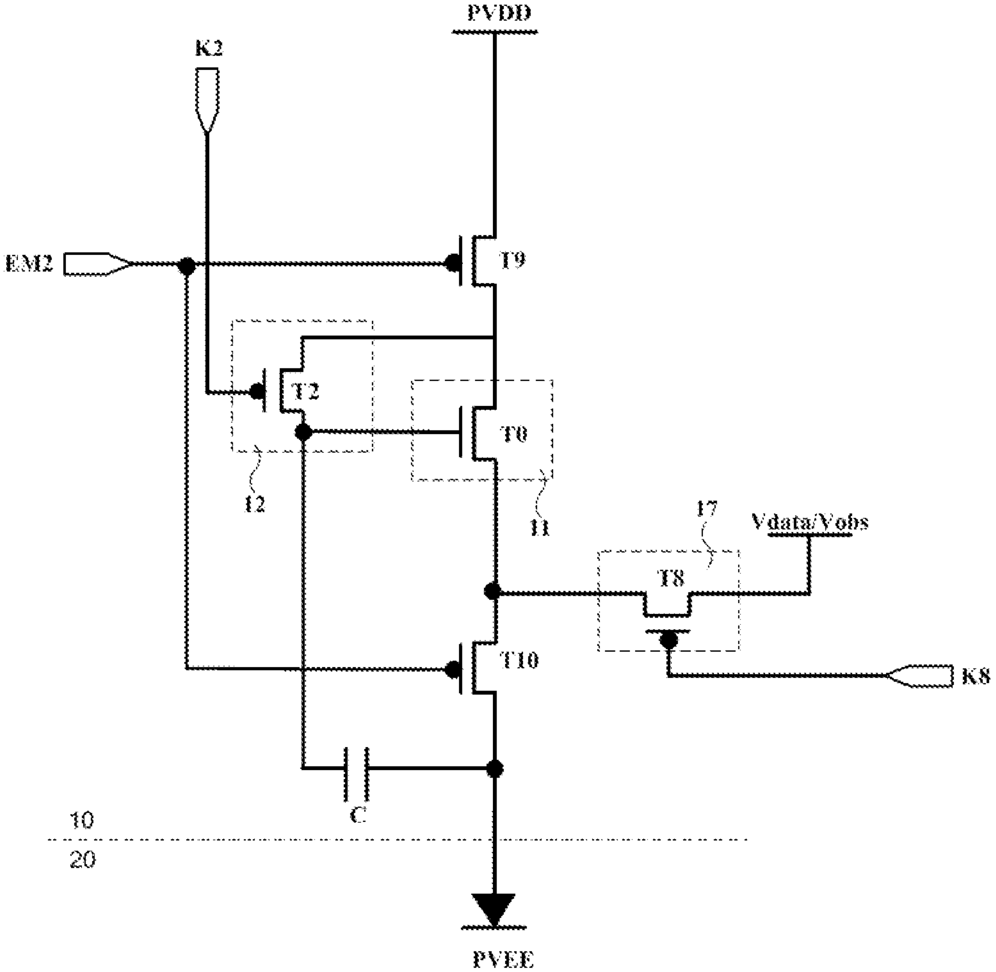
FIG. 24 illustrates a schematic diagram of another exemplary pixel circuit consistent with disclosed embodiments of the present disclosure.

In one embodiment, the driving transistor T0 may be an N-type transistor. FIG. 24 illustrates a timing sequence diagram of another pixel circuit. The pixel circuit illustrated in FIG. 24 may be on the basis of the pixel circuit illustrated in FIG. 22. Referring to FIG. 24, the pixel circuit may further include the ninth transistor T9 and the tenth transistor T10 for controlling the light emission. Both the gates of the ninth transistor T9 and the tenth transistor T10 may receive the light-emitting control signal EM2. The first electrode of the ninth transistor T9 may receive the first power signal PVDD, and the second electrode of the ninth transistor T9 may be connected to the drain of the driving transistor T0. The first electrode of the tenth transistor T10 may be connected to the source of the driving transistor T0, the second electrode of the tenth transistor T10 may be connected to one end of the light-emitting element 20, and another end of the light-emitting element 20 may receive the second power signal PVEE.

The light-emitting control signal EM2 may be a pulse signal. When the light-emitting control signal EM2 is an effective pulse, the light-emitting element 20 may be in a light-emitting stage. When the light-emitting control signal EM2 is an invalid pulse, the light-emitting element 20 may be in a non-light-emitting stage. The pixel circuit may further include a holding capacitor C configured to maintain a potential of the node. A first terminal of the holding capacitor C may be connected to the source of the driving transistor T0, and a second terminal of the holding capacitor C may be connected to the gate of the driving transistor T0.

Figure 25:
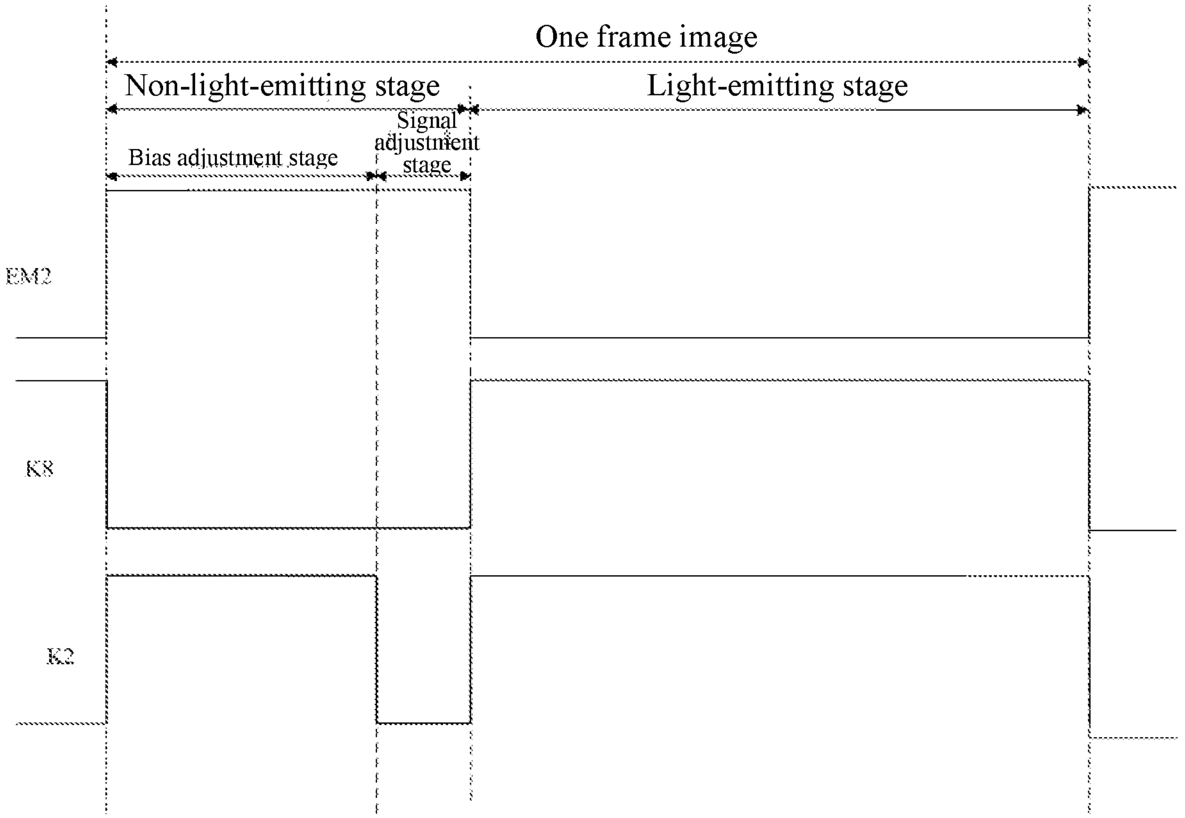
FIG. 25 illustrates another exemplary timing sequence diagram consistent with disclosed embodiments of the present disclosure.

FIG. 25 illustrates a timing sequence diagram of a pixel circuit illustrated in any one of FIG. 23 and FIG. 24. Referring to FIG. 25, first, the light-emitting control signal EM2 may be an invalid pulse, such that the pixel circuit 10 may control the light-emitting element 20 to be in a non-light-emitting stage. The non-light-emitting stage may include a bias adjustment stage and a signal adjustment stage.

In the bias adjustment stage, the second scanning signal K2 may be an invalid pulse to control the second transistor T2 to be turned off, and at the same time, the eighth scanning signal K8 may control the eighth transistor T8 to be turned on, such that the bias adjustment signal Vobs may be transmitted to the source of the driving transistor T0, and then the bias adjustment signal Vobs may be transmitted to the drain of the driving transistor T0 through the driving transistor T0, to adjust the bias state of the driving transistor T0. The bias adjustment signal Vobs may be provided through a port of the data signal Vdata.

In the signal adjustment stage, the second scanning signal K2 may be an effective pulse to control the second transistor T2 to be turned on, at the same time, the eighth scanning signal K8 may control the eighth transistor T8 to be turned on, such that the data signal Vdata multiplexed as a preset signal may be transmitted to the gate of the driving transistor T0 through the eighth transistor T8, the driving transistor T0, and the second transistor T2. Then, the light-emitting control signal EM2 may be an effective pulse, such that the pixel circuit 10 may control the light-emitting element 20 to be in the light-emitting stage. It should be noted that the light-emitting control signal EM2 may be a single control signal to simultaneously control two transistors. In another embodiment, the light-emitting control signal EM2 may be divided into two sub-light-emitting control signals, to control respective transistors, respectively. The time length of one of the two sub-light-emitting control signals which has a larger time length of the outputted invalid pulse may be the time length of the non-light-emitting stage.

In one embodiment, the working process of the pixel circuit may include the bias adjustment stage, and the pixel circuit may further include a separate bias adjustment module, which may be configured to provide a bias adjustment signal for the driving transistor in the bias adjustment stage. Therefore, any other module in the pixel circuit may not need to be multiplexed to provide a bias adjustment signal for the driving transistor in the bias adjustment stage.

Figure 26:
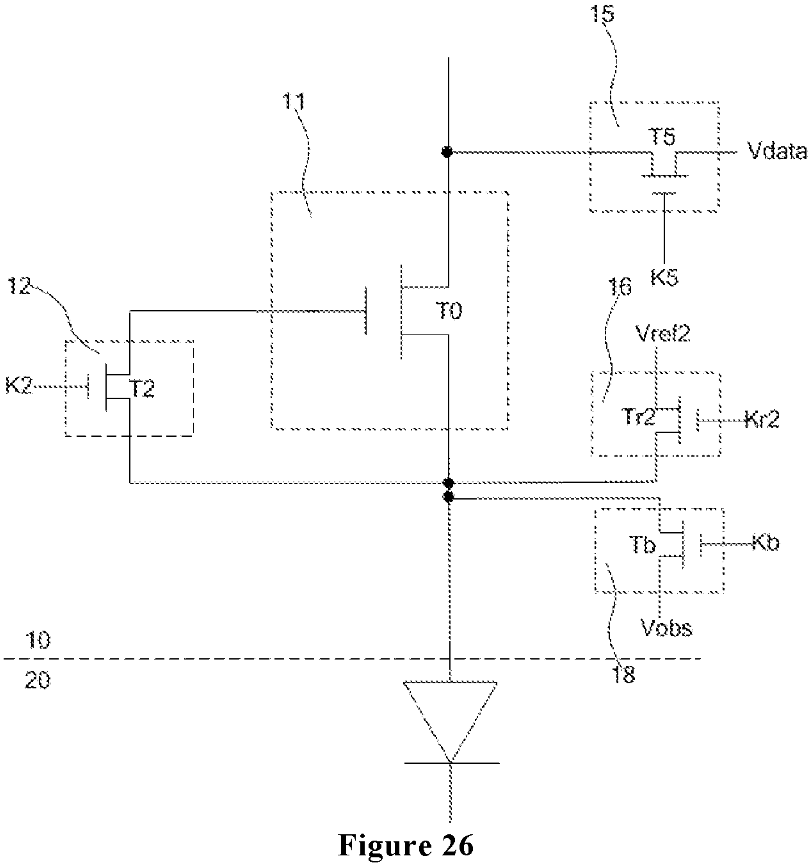
FIG. 26 illustrates a schematic diagram of another exemplary pixel circuit consistent with disclosed embodiments of the present disclosure.

FIG. 26 illustrates a schematic diagram of another pixel circuit. The pixel circuit 10 illustrated in FIG. 26 may be improved on the basis of the pixel circuit illustrated in FIG. 18, which may not be limited by the present disclosure. FIG. 18 may merely be one of many circuits that are capable of being improved in the present disclosure. Referring to FIG. 26, the pixel circuit may further include a bias adjustment module 18. The bias adjustment module 18 may be connected to the source or the drain of the driving transistor T0. In the bias adjustment stage, the bias adjustment module 18 may be turned on, the compensation module 12 may be turned off, and the bias adjustment module 18 may write the bias adjustment signal Vobs to the source or the drain of the driving transistor T0. The bias adjustment module 18 may include a bias adjustment transistor Tb. A first electrode of the bias adjustment transistor Tb may receive the bias adjustment signal Vobs, a second electrode of the bias adjustment transistor Tb may be connected to the drain of the driving transistor T0, and a gate of the bias adjustment transistor Tb may receive the bias adjustment scanning signal Kb.

Figure 27:
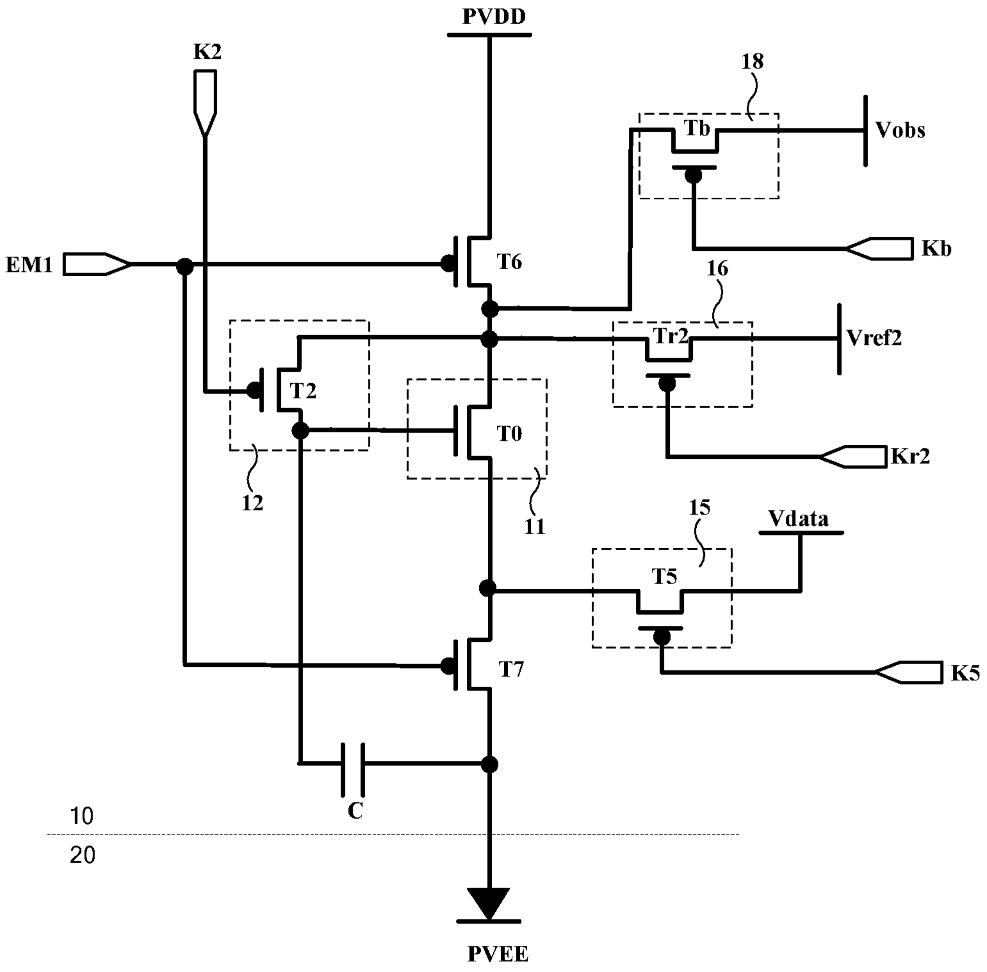
FIG. 27 illustrates a schematic diagram of another exemplary pixel circuit consistent with disclosed embodiments of the present disclosure.

The pixel circuit 10 illustrated in FIG. 27 may be an improved circuit on the basis of the pixel circuit illustrated in FIG. 20. Referring to FIG. 27, the pixel circuit may further include the bias adjustment module 18, and the bias adjustment module 18 may include a bias adjustment transistor Tb. A first electrode of the bias adjustment transistor Tb may receive the bias adjustment signal Vobs, a second electrode of the bias adjustment transistor Tb may be connected to the source or the drain of the driving transistor T0, and a gate of the bias adjustment transistor Tb may receive the bias adjustment scanning signal Kb.

Figure 28:
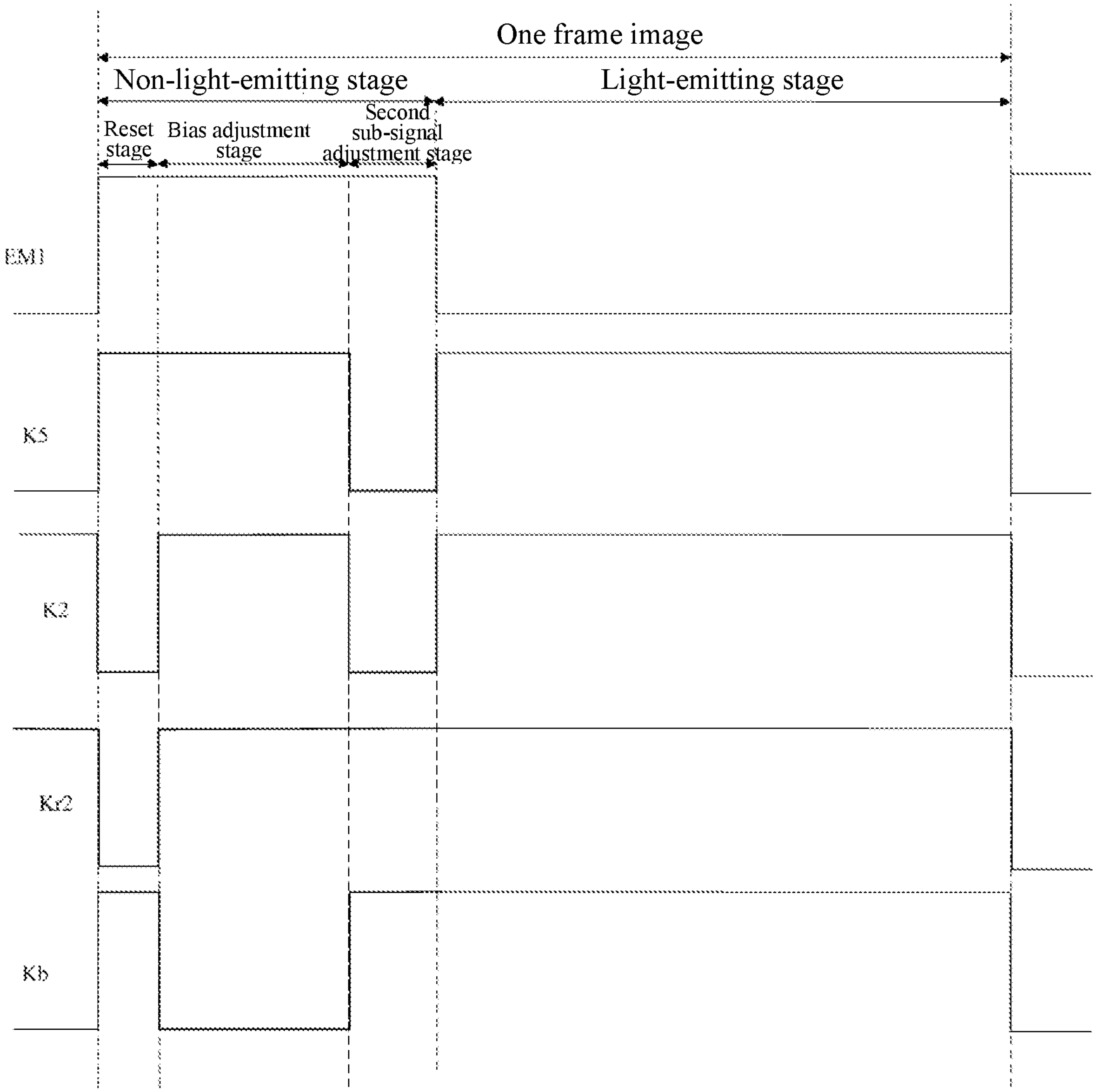
FIG. 28 illustrates another exemplary timing sequence diagram consistent with disclosed embodiments of the present disclosure.

FIG. 28 illustrates a timing sequence diagram of the pixel circuit in FIG. 27. Referring to FIG. 28, first, the light-emitting control signal EM1 may be an invalid pulse, such that the pixel circuit 10 may control the light-emitting element 20 to be in a non-light-emitting stage. The non-light-emitting stage may include a reset stage (the reset stage may be the first sub-signal adjustment stage), a bias adjustment stage, and a second sub-signal adjustment stage. In the reset stage, the reset scanning signal Kr2 may control the reset transistor Tr2 to be turned on, and at the same time, the second scanning signal K2 may be an effective pulse to control the second transistor T2 to be turned on, such that the reset signal Vref2 may be transmitted to the gate of the driving transistor T0 through the reset transistor Tr2 and the second transistor T2.

In the bias adjustment stage, the second scanning signal K2 may be an invalid pulse to control the second transistor T2 to be turned off, and at the same time, the fifth scanning signal K5 may control the fifth transistor T5 to be turned off, and the bias adjustment scanning signal Kb may control the bias adjustment transistor Tb to be turned on, such that the bias adjustment signal Vobs may be transmitted to the drain of the driving transistor T0, to adjust the bias state of the driving transistor T0. The bias adjustment signal Vobs may be a fixed-level signal. In one embodiment, when the driving transistor T0 is a P-type transistor, Vobs may be a high-level signal, and when the driving transistor T0 is an N-type transistor, Vobs may be a low-level signal.

In the second sub-signal adjustment stage, the second scanning signal K2 may be an effective pulse to control the second transistor T2 to be turned on, and at the same time, the fifth scanning signal K5 may control the fifth transistor T5 to be turned on, such that the data signal Vdata multiplexed as a preset signal may be transmitted to the gate of the driving transistor T0 through the fifth transistor T5, the driving transistor T0, and the second transistor T2. Then, the light-emitting control signal EM1 may be an effective pulse, such that the pixel circuit 10 may control the light-emitting element 20 to be in the light-emitting stage. It should be noted that the light-emitting control signal EM1 may be a single control signal to simultaneously control two transistors. In another embodiment, the light-emitting control signal EM1 may be divided into two sub-light-emitting control signals, to control respective transistors, respectively. The time length of one of the two sub-light-emitting control signals which has a larger time length of the outputted invalid pulse may be the time length of the non-light-emitting stage.

In one embodiment, the pixel circuit may further include a light-emitting control module, and the light-emitting control module may be configured to selectively allow the light-emitting element to enter the light-emitting stage. The light-emitting control module may include a first light-emitting control module and a second light-emitting control module. A control terminal of the first light-emitting control module may receive the first light-emitting control signal, and a control terminal of the second light-emitting control module may receive the second light-emitting control signal. In the non-light-emitting stage, a time length of the invalid pulse of the first light-emitting control signal may be S1, and a time length of the invalid pulse of the second light-emitting control signal may be S2, where the time length of the non-light-emitting stage may be a larger one of S1 and S2.

Figure 29:
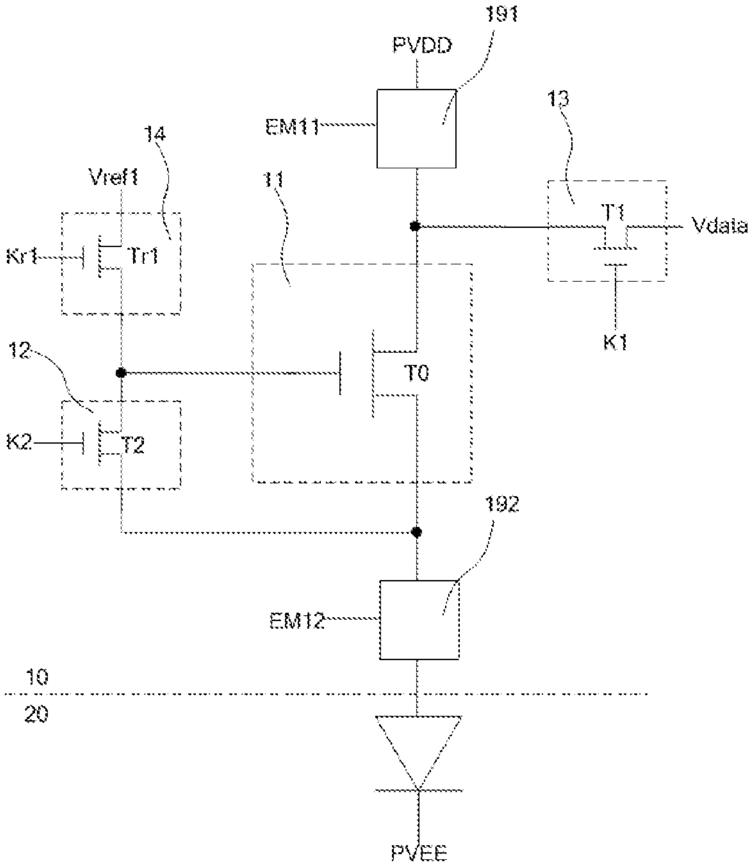
FIG. 29 illustrates a schematic diagram of another exemplary pixel circuit consistent with disclosed embodiments of the present disclosure.

In one embodiment, the pixel circuit 10 illustrated in FIG. 29 may be an improved pixel circuit on the basis of the pixel circuit illustrated in FIG. 14, which may not be limited by the present disclosure. The pixel circuit in FIG. 14 may merely be one of circuits that are capable of being improved. Referring to FIG. 29, the pixel circuit 10 may include the first light-emitting control module 191 and the second light-emitting control module 192. One end of the first light-emitting control module 191 may receive the first power signal PVDD, another end of the first light-emitting control module 191 may be connected to the first electrode of the driving transistor T0, and a control terminal of the first light-emitting control module 191 may receive the first light-emitting control signal EM11. One end of the second light-emitting control module 192 may be connected to the second electrode of the driving transistor T0, another end of the second light-emitting control module 192 may be connected to one end of the light-emitting element 20, a control terminal of the second light-emitting control module 192 may receive the second light-emitting control signal EM12, and another end of the light-emitting element 20 may be connected to the second power signal PVEE. When the driving transistor T0 is a P-type transistor, the first electrode of the driving transistor T0 may be the source, and the second electrode of the driving transistor T0 may be the drain. When the driving transistor T0 is an N-type transistor, the first electrode of the driving transistor T0 may be the drain and the second electrode of the driving transistor T0 may be the source.

Further, the effective pulse of the first light-emitting control signal EM11 may control the first light-emitting control module 191 to be turned on, and the invalid pulse of the first light-emitting control signal EM11 may control the first light-emitting control module 191 to be turned off. The effective pulse of the second light-emitting control signal EM12 may control the second light-emitting control module 192 to be turned on, and the invalid pulse of the second light-emitting control signal EM12 may control the second light-emitting control module 192 to be turned off. Therefore, the transmission path between the driving transistor T0 and the light-emitting element 20 may be turned on or turned off by the first light-emitting control signal EM11 and the second light-emitting control signal EM12.

Figure 30:
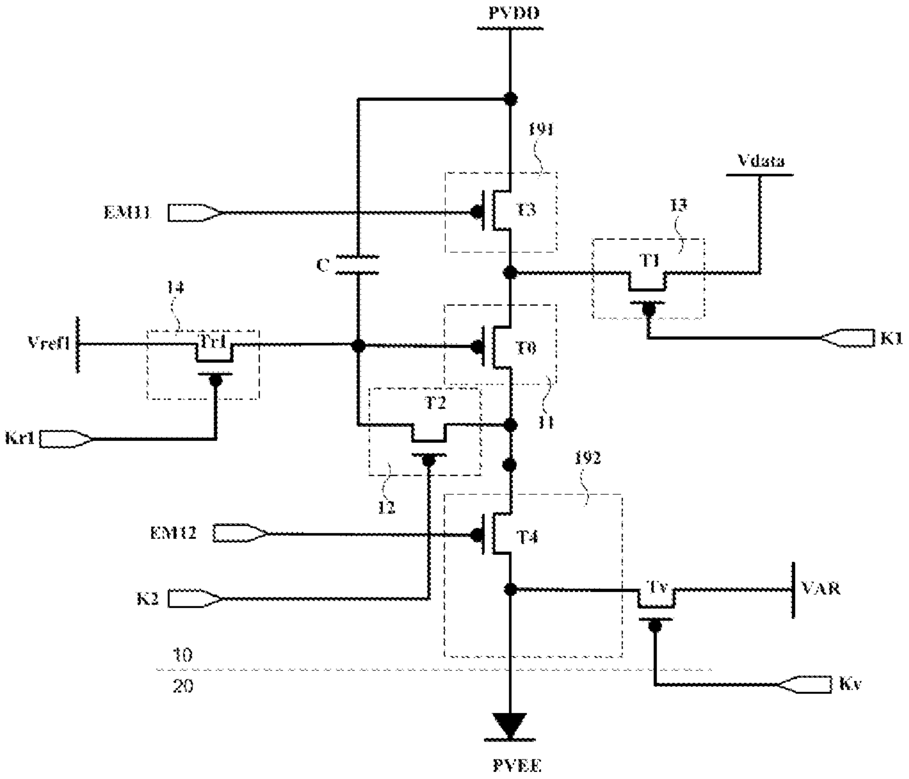
FIG. 30 illustrates a schematic diagram of another exemplary pixel circuit consistent with disclosed embodiments of the present disclosure.

In one embodiment, the pixel circuit 10 illustrated in FIG. 30 may be an improved pixel circuit on the basis of the pixel circuit illustrated in FIG. 15, which may not be limited by the present disclosure. The pixel circuit in FIG. 15 may merely be one of circuits that are capable of being improved. Referring to FIG. 30, one end of the first light-emitting control module 191 may be connected to one of the source and drain of the driving transistor T0, and the other end of the first light-emitting control module 191 may be connected to the first power signal terminal for receiving the first power signal PVDD. When the driving transistor T0 illustrated in FIG. 30 is a P-type transistor, one end of the first light-emitting control module 191 may be connected to the source of the driving transistor T0. One end of the second light-emitting control module 192 may be connected to the other one of the source and drain of the driving transistor T0, and the other end of the second light-emitting control module 192 may be coupled to an initialization signal terminal for receiving an initialization signal VAR. When the driving transistor T0 in FIG. 30 is a P-type transistor, one end of the second light-emitting module 192 may be connected to the drain of the driving transistor T0.

The driving transistor T0 may be a PMOS transistor. The first light-emitting control module 191 may include the third transistor T3. The first electrode of the third transistor T3 may receive the first power signal PVDD, the second electrode of the third transistor T3 may be connected to the source of the driving transistor T0, and the gate of the third transistor T3 may receive the first light-emitting control signal EM11. The second light-emitting control module 192 may include the fourth transistor T4. The fourth transistor T4 may be coupled with the initialization signal VAR through the initialization transistor Tv. The first electrode of the fourth transistor T4 may be connected to the drain of the driving transistor T0, the second electrode of the fourth transistor T4 may be connected to one end of the light-emitting element 20 and the first electrode of the initialization transistor Tv, and the gate of the fourth transistor T4 may receive the second light-emitting control signal EM12. The second electrode of the initialization transistor Tv may receive the initialization signal VAR, and the gate of the initialization transistor Tv may receive the control signal Kv.

Figure 31:
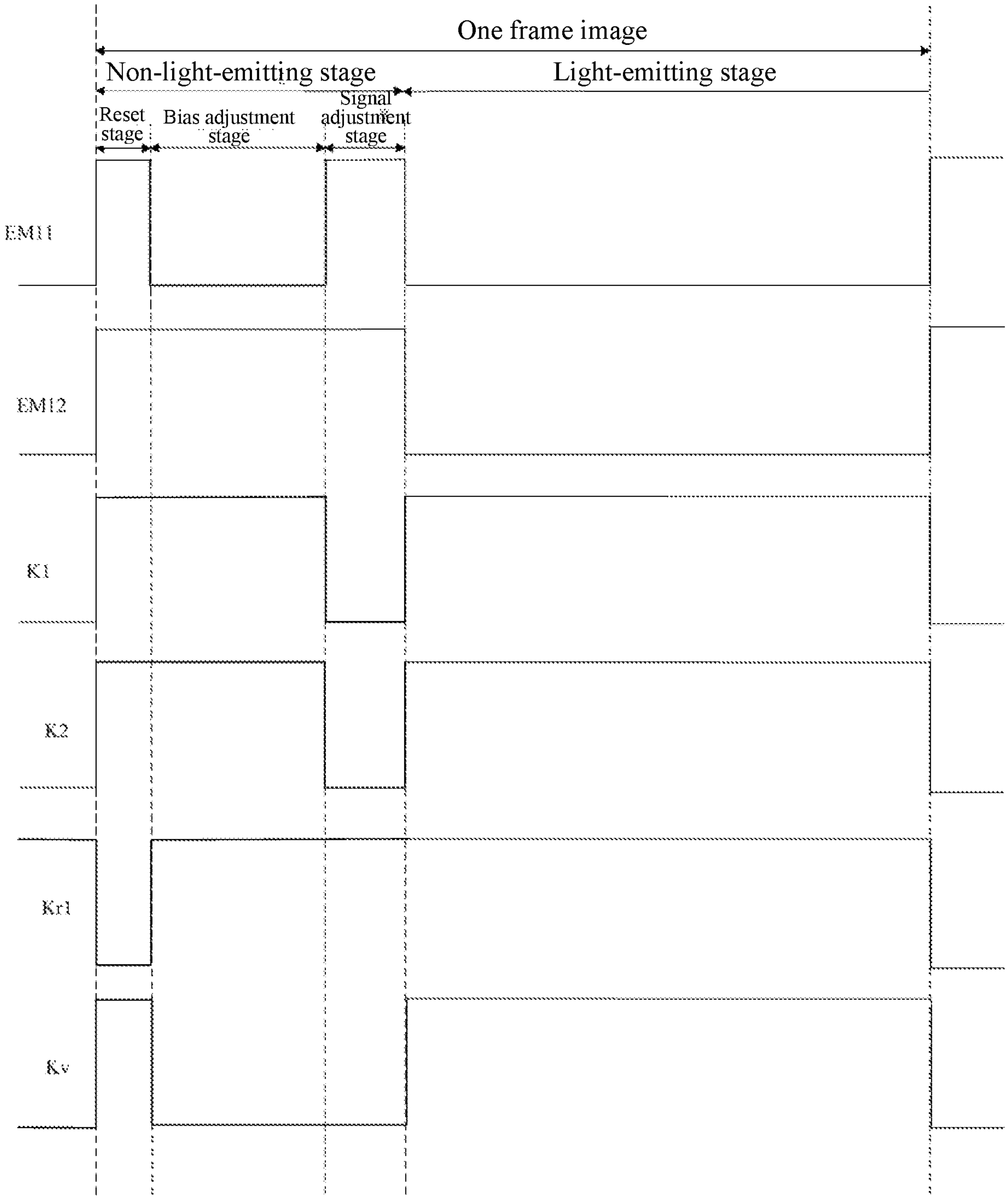
FIG. 31 illustrates another exemplary timing sequence diagram consistent with disclosed embodiments of the present disclosure.

Referring to the timing sequence diagram illustrated in FIG. 31, in the bias adjustment stage, the first light-emitting control module 191 may be turned on, and the second light-emitting control module 192 may be turned off. The first power signal PVDD may be the bias adjustment signal, and the bias adjustment signal may be transmitted to the source of the driving transistor T0 through the first light-emitting control module 191, and then may be transmitted to the drain of the driving transistor T0 through the driving transistor T0. The initialization transistor Tv in the present disclosure may be turned on when the fourth transistor T4 is turned off, and may initialize the light-emitting element 20 in the non-light-emitting stage to enable the light-emitting element 20 to be in a dark state.

Figure 32:
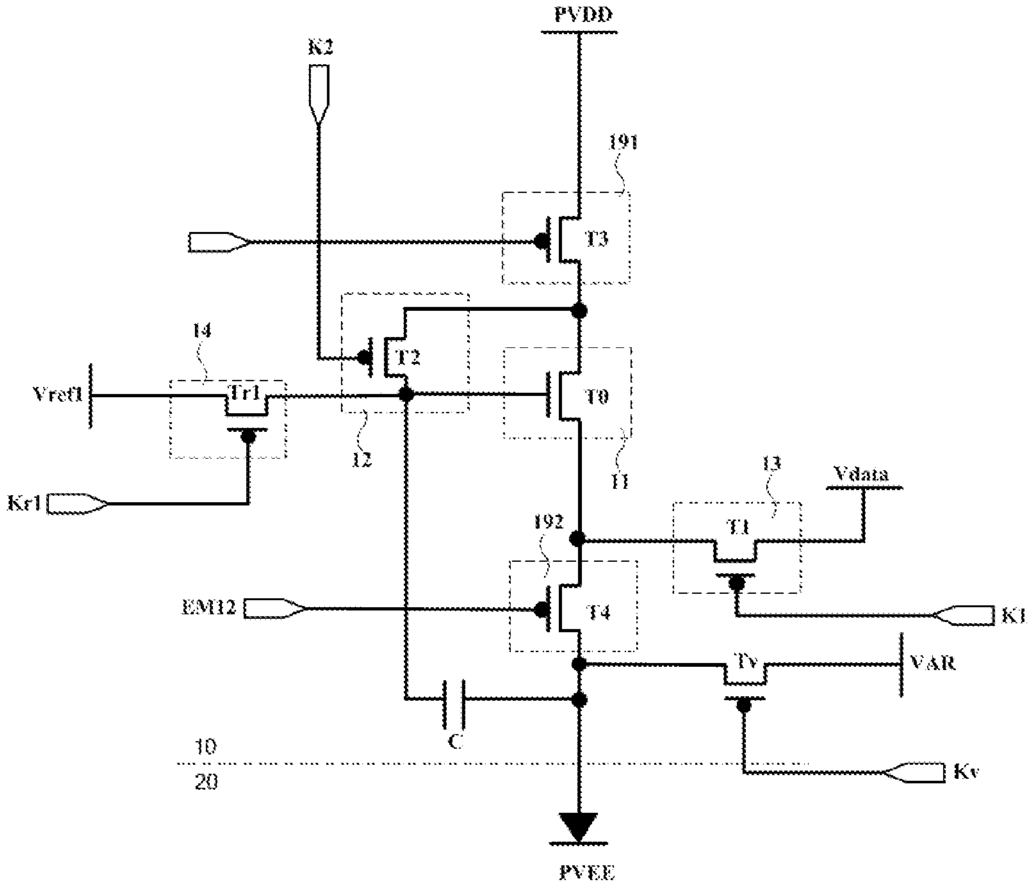
FIG. 32 illustrates a schematic diagram of another exemplary pixel circuit consistent with disclosed embodiments of the present disclosure.
Figure 33:
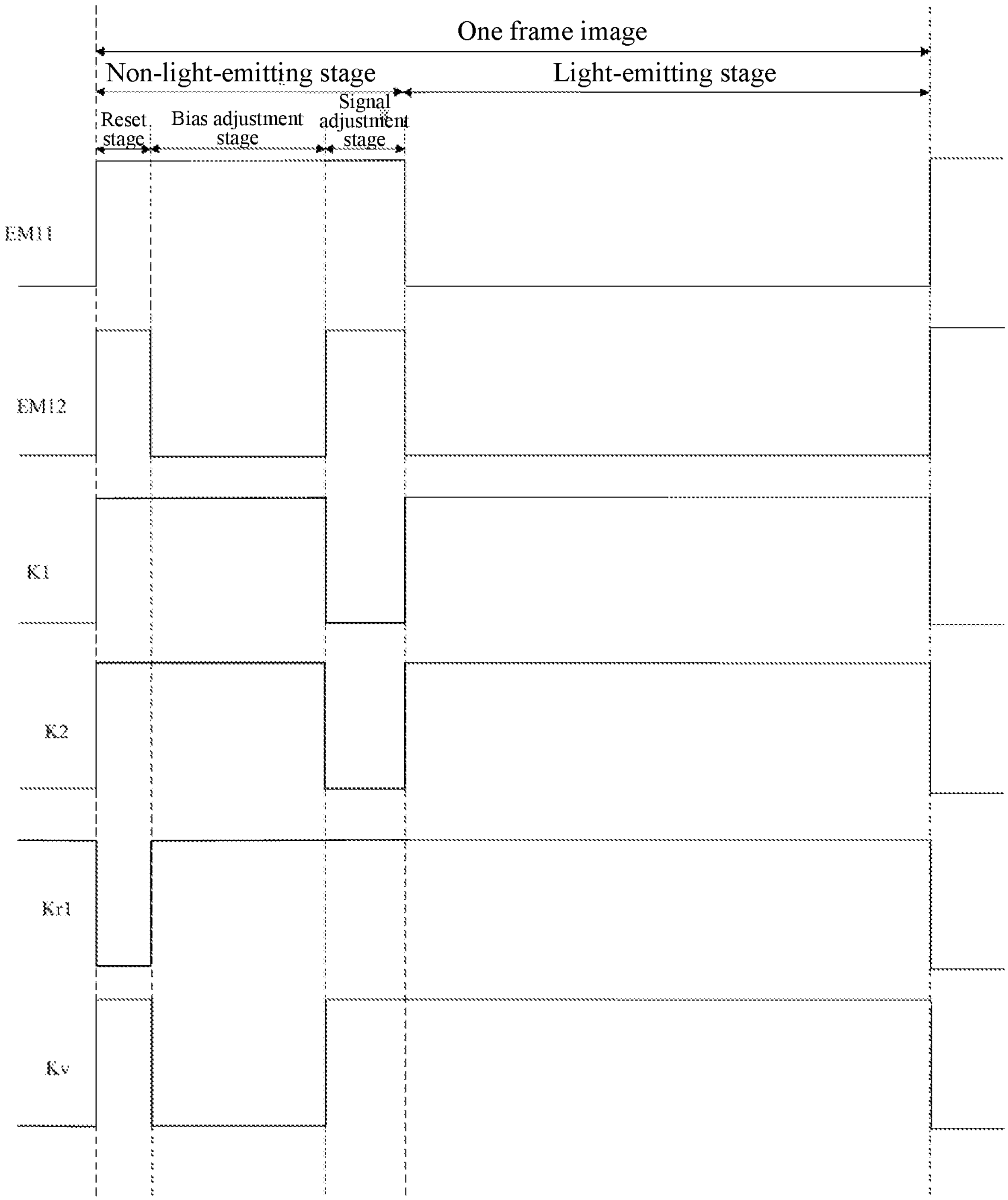
FIG. 33 illustrates another exemplary timing sequence diagram consistent with disclosed embodiments of the present disclosure.

In another embodiment, the pixel circuit 10 illustrated in FIG. 32 may be an improved pixel circuit on the basis of the pixel circuit illustrated in FIG. 16, which may not be limited by the present disclosure. The pixel circuit in FIG. 16 may merely be one of circuits that are capable of being improved. Referring to FIG. 32, one end of the first light-emitting control module 191 may be connected to one of the source and drain of the driving transistor T0, and another end of the first light-emitting control module 191 may be connected to the first power signal terminal for receiving the first power signal PVDD. When the driving transistor T0 illustrated in FIG. 32 is an N-type transistor, one end of the first light-emitting control module 191 may be connected to the drain of the driving transistor T0. One end of the second light-emitting control module 192 may be connected to the other one of the source and drain of the driving transistor T0, and another end of the second light-emitting control module 192 may be coupled to the initialization signal terminal for receiving the initialization signal VAR. When the driving transistor T0 in FIG. 32 is an N-type transistor, one end of the second light-emitting module 192 may be connected to the source of the driving transistor T0.

The driving transistor T0 may be an NMOS transistor. In the bias adjustment stage, the second light-emitting control module 192 may be turned on, and the first light-emitting control module 191 may be turned off. The initialization signal VAR may be the bias adjustment signal, and the bias adjustment signal VAR may be transmitted to the source of the driving transistor T0 through the initialization transistor Tv and the second light-emitting control module 192, and then may be transmitted to the drain of the driving transistor T0 through the driving transistor T0.

In one embodiment, in a same mode, when the frame refresh rate of the display panel is F1, the time length of the non-light-emitting stage may be A1, and the time length of the bias adjustment stage may be B1. When the frame refresh rate of the display panel is F2, the time length of the non-light-emitting stage may be A2, and the time length of the bias adjustment stage may be B2, where F1<F2, and B1/A1>B2/A2. In one embodiment, when the frame refresh rate is F1, the refresh rate may be substantially small, and the time length of one refresh cycle may be substantially large. For example, when F1=1 HZ, one refresh cycle may be 1 second, and the time length of the light-emitting stage may be substantially large. When the frame refresh rate is F2, the refresh rate may be substantially large, and the time length of one refresh cycle may be substantially small. For example, when F2=60 HZ, one refresh cycle may be 1/60 second, and the time length of the light-emitting stage may be substantially small.

When the time length of the light-emitting stage is substantially large, the bias phenomenon of the driving transistor may be substantially obvious, which may require a bias adjustment stage with a substantially large time length to be cancelled out. When the time length of the light-emitting stage is substantially small, the time length of the bias adjustment stage may be substantially small. Therefore, in the present disclosure, B1/A1>B2/A2. In other words, when the frame refresh rate is a substantially low frequency F1, a ratio of the time length of the bias adjustment stage over the time length of the light-emitting stage may be substantially large. When the frame refresh rate is a substantially high frequency F2, the ratio of the time length of the bias adjustment stage over the time length of the light-emitting stage may be substantially small.

Further, in one embodiment, B1>B2. When F1<F2, when the frame refresh rate is substantially small, the time length of the bias adjustment stage may be substantially large. When the frame refresh rate is substantially large, the time length of the bias adjustment stage may be substantially small. Therefore, the bias state of the driving transistor may be effectively adjusted at both high and low frame refresh rates.

Figure 34:
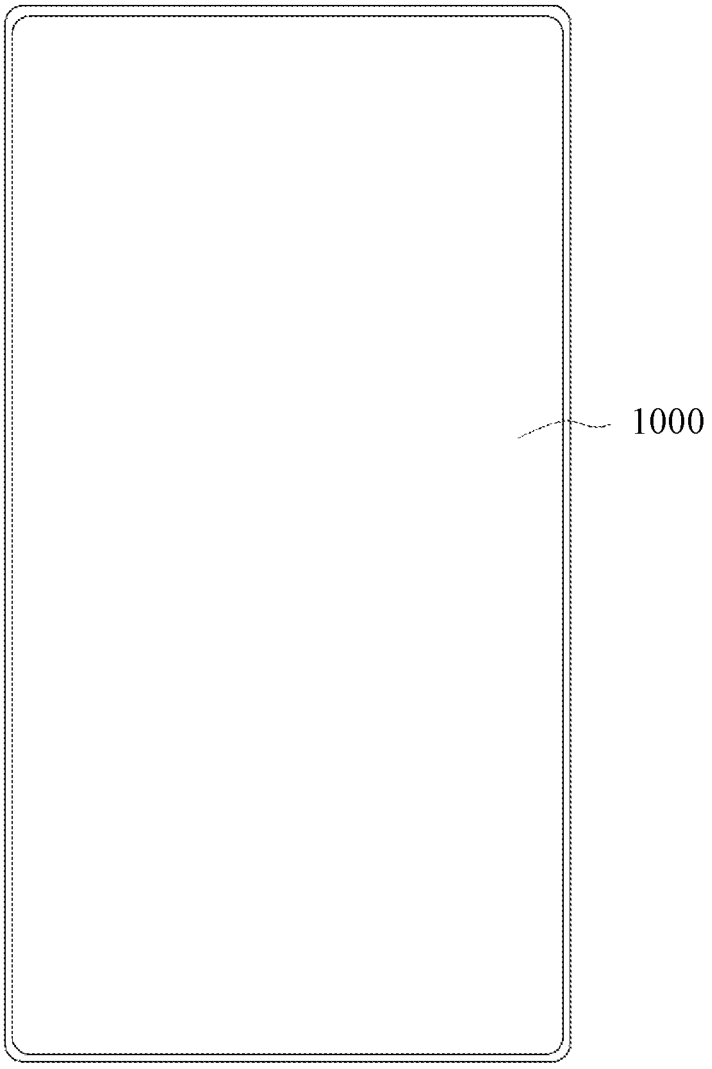
FIG. 34 illustrates a schematic diagram of an exemplary display device consistent with disclosed embodiments of the present disclosure.

Accordingly, the present disclosure also provides a display device. The display device may include the display panel in any one of the disclosed embodiments. FIG. 34 illustrates a schematic diagram of a display device. The display device 1000 may be a mobile terminal device. In one embodiment, the display device may be an electronic display device such as a mobile phone, a computer, a vehicle-mounted terminal, etc., which may not be limited by the present disclosure.

Accordingly, in the disclosed display panel and display device, the time length of the bias adjustment stage and the time length of the non-light-emitting stage may not change in the same proportion. When the display panel changes from the first mode to the second mode based on the changing requirements of the brightness, the time length of the non-light-emitting stage may be shortened. In view of this, the time length of the bias adjustment stage may be adjusted according to W1/L1<W2/L2, such that the time length change of the bias adjustment stage caused by the mode change of the operating state may be substantially small. In view of this, the time length of the bias adjustment stage in the second mode may be substantially large, thereby avoiding the flickering phenomenon caused by a substantially small time length of the bias adjustment stage in the second mode when adjusting the mode of the display panel. Therefore, in the present disclosure, the flickering problem of the display panel in different brightness modes may be solved, which may improve the display effect of the display device.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel comprising:

a pixel circuit including a driving module, a data writing module, and a bias adjustment module, the driving module including a driving transistor, the data writing module being configured to provide a data signal for the driving transistor, and the bias adjustment module being configured to provide a bias adjustment signal for the driving transistor; and a light-emitting element;

wherein:

a time period of one frame of the display panel includes a non-light-emitting stage and a light-emitting stage, the non-light-emitting stage including a bias adjustment stage, at least one of a source or a drain of the driving transistor being configured to receive the bias adjustment signal in the bias adjustment stage;

an operating state of the pixel circuit includes a first mode and a second mode, a time length of the non-light-emitting stage in the first mode is L1, and a time length of the non-light-emitting stage in the second mode is L2;

L1>L2;

a working process of the display panel in the first mode includes a first frame, and a working process of the display panel in the second mode includes a second frame;

a time length of the bias adjustment stage in the first frame is W1, and a time length of the bias adjustment stage in the second frame is W2;

W2/W1≥1, and/or W2/W1<L1/L2.

2. The display panel of claim 1, wherein:
the bias adjustment stage in the first frame includes N1 sub-bias adjustment stages, wherein N1≥1;
the bias adjustment stage in the second frame includes N2 sub-bias adjustment stages, wherein N2≥1; and
a time length of at least one sub-bias adjustment stage in the first frame is equal to a time length of at least one sub-bias adjustment stage in the second frame.

3. The display panel of claim 2, wherein:
a time length of an $i^{th}$ sub-bias adjustment stage in the first frame is equal to a time length of an $i^{th}$ sub-bias adjustment stage in the second frame, wherein 1≤i≤N0; and
when N1≠N2, N0 is a smaller one of N1 and N2, and when N1=N2, N0=N1=N2.

4. The display panel of claim 2, wherein:
|N1−N2|≥1.

5. The display panel of claim 1, wherein:
a time interval from a beginning of the non-light-emitting stage to a beginning of the bias adjustment stage in the first frame is L3, and a time interval from a beginning of the non-light-emitting stage to a beginning of the bias adjustment stage in the second frame is L4, wherein L3>L4.

6. The display panel of claim 1, wherein:
a brightness of the light-emitting element in the first mode is lower than a brightness of the light-emitting element in the second mode.

7. The display panel of claim 1, wherein:
W1/L1<½, and/or W2/L2<½.

8. The display panel of claim 1, wherein:
in the bias adjustment stage, the bias adjustment module is turned on, and the bias adjustment module is configured to provide the bias adjustment signal to the source or the drain of the driving transistor.

9. A display device comprising the display panel of claim 1.

10. A display panel comprising:
a pixel circuit including a driving module, a data writing module, a bias adjustment module, and a compensation module, the driving module including a driving transistor, the data writing module being configured to provide a data signal for the driving transistor, the bias adjustment module being configured to provide a bias adjustment signal for the driving transistor, and the compensation module being connected between a gate and a drain of the driving transistor; and
a light-emitting element;
wherein:
a time period of one frame of the display panel includes a non-light-emitting stage and a light-emitting stage, the non-light-emitting stage including a bias adjustment stage, the compensation module being turned off and at least one of a source or the drain of the driving transistor being configured to receive the bias adjustment signal in the bias adjustment stage;
an operating state of the pixel circuit includes a first mode and a second mode, a time length of the non-light-emitting stage in the first mode is L1, and a time length of the non-light-emitting stage in the second mode is L2;
L1>L2;
a working process of the display panel in the first mode includes a first frame, and a working process of the display panel in the second mode includes a second frame;
a time length of the bias adjustment stage in the first frame is W1, and a time length of the bias adjustment stage in the second frame is W2;
W2/W1≥1, and/or W2/W1<L1/L2.

11. The display panel of claim 10, wherein:
the bias adjustment stage in the first frame includes N1 sub-bias adjustment stages, wherein N1≥1;
the bias adjustment stage in the second frame includes N2 sub-bias adjustment stages, wherein N2≥1; and
a time length of at least one sub-bias adjustment stage in the first frame is equal to a time length of at least one sub-bias adjustment stage in the second frame.

12. The display panel of claim 11, wherein:
a time length of an $i^{th}$ sub-bias adjustment stage in the first frame is equal to a time length of an $i^{th}$ sub-bias adjustment stage in the second frame, wherein 1≤i≤N0; and
when N1≠N2, NO is a smaller one of N1 and N2, and when N1=N2, N0=N1=N2.

13. The display panel of claim 11, wherein:
|N1−N2|≥1.

14. The display panel of claim 10, wherein:
a time interval from a beginning of the non-light-emitting stage to a beginning of the bias adjustment stage in the first frame is L3, and a time interval from a beginning of the non-light-emitting stage to a beginning of the bias adjustment stage in the second frame is L4, wherein L3>L4.

15. The display panel of claim 10, wherein:
a brightness of the light-emitting element in the first mode is lower than a brightness of the light-emitting element in the second mode.

16. The display panel of claim 10, wherein:
W1/L1<½, and/or W2/L2<½.

17. The display panel of claim 10, wherein:
in the bias adjustment stage, the bias adjustment module is turned on, the compensation module is turned off, and the bias adjustment module is configured to provide the bias adjustment signal to the source or the drain of the driving transistor.

18. A display device comprising the display panel of claim 10.

19. A display panel comprising:
a pixel circuit including a driving module, the driving module including a driving transistor; and
a light-emitting element;
wherein:
a time period of one frame of the display panel includes a non-light-emitting stage and a light-emitting stage, the non-light-emitting stage including a bias adjustment stage, at least one of a source or a drain of the driving transistor being configured to receive a bias adjustment signal in the bias adjustment stage;
an operating state of the pixel circuit includes a first mode and a second mode, a time length of the non-light-emitting stage in the first mode is L1, and a time length of the non-light-emitting stage in the second mode is L2;
L1>L2;
a working process of the display panel in the first mode includes a first frame, and a working process of the display panel in the second mode includes a second frame;
a time length of the bias adjustment stage in the first frame is W1, and a time length of the bias adjustment stage in the second frame is W2;
W2/W1≥1, and/or W2/W1<L1/L2.

20. A display device comprising the display panel of claim 19.

* * * * *